(12) United States Patent
Matsuda

(10) Patent No.: US 10,754,843 B2
(45) Date of Patent: Aug. 25, 2020

(54) METHOD AND APPARATUS FOR INFORMATION MANAGEMENT

(71) Applicant: FUJITSU LIMITED, Kawasaki-shi, Kanagawa (JP)

(72) Inventor: Kazuhito Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 15/492,591

(22) Filed: Apr. 20, 2017

(65) Prior Publication Data

US 2017/0357682 A1 Dec. 14, 2017

(30) Foreign Application Priority Data

Jun. 10, 2016 (JP) .................................. 2016-116009

(51) Int. Cl.
*G06F 16/23* (2019.01)
*G06F 16/27* (2019.01)
*G06F 16/22* (2019.01)

(52) U.S. Cl.
CPC ........ *G06F 16/235* (2019.01); *G06F 16/2282* (2019.01); *G06F 16/27* (2019.01); *G06F 16/273* (2019.01)

(58) Field of Classification Search
CPC ...... G06F 16/235; G06F 16/27; G06F 16/273; G06F 16/2282
USPC ....................................................... 707/620
See application file for complete search history.

(56) References Cited

U.S. PATENT DOCUMENTS

| 5,870,473 A | * | 2/1999 | Boesch | ................... | G06Q 20/00 380/279 |
| 7,715,324 B1 | * | 5/2010 | Harvell | ................... | H04L 61/30 370/252 |
| 9,569,517 B1 | * | 2/2017 | Smola | ..................... | G06F 11/14 |
| 10,284,381 B1 | * | 5/2019 | Weiner | .................... | H04L 45/02 |

(Continued)

FOREIGN PATENT DOCUMENTS

| JP | 2009-20757 | 1/2009 |
| JP | 2013-61739 | 4/2013 |
| JP | 2015-35182 | 2/2015 |

OTHER PUBLICATIONS

David Karger et al., "Consistent Hashing and Random Trees: Distributed Caching Protocols for Relieving Hot Spots on the World Wide Web", Proceedings of the twenty-ninth annual ACM symposium on Theory of computing (STOC 97), May 1997 (11 pages).

*Primary Examiner* — Mark E Hershley
(74) *Attorney, Agent, or Firm* — Fujitsu Patent Center

(57) ABSTRACT

There is provided an information management method used by a computer that manages a system storing key-data pairs, each including a key obtained by application of a predetermined function and data associated with the key, in such a way as to be distributed among a plurality of nodes. The method includes storing, in a management table, information on an identifier common to a plurality of systems, one or more keys commonly assigned to the identifier, and nodes assigned to the identifier; and reflecting, when a node whose assignment to the identifier has been once cancelled is reassigned to the identifier, the reassignment of the node into the management table, and implementing synchronization of one or more key-data pairs corresponding to the keys assigned to the identifier between the reassigned node and remaining nodes assigned to the identifier.

6 Claims, 27 Drawing Sheets

(56) References Cited

U.S. PATENT DOCUMENTS

| | | | | |
|---|---|---|---|---|
| 2002/0038360 | A1* | 3/2002 | Andrews | H04L 29/12066 709/223 |
| 2005/0071630 | A1* | 3/2005 | Thornton | H04L 63/0823 713/156 |
| 2007/0008884 | A1* | 1/2007 | Tang | H04L 29/06 370/230 |
| 2009/0037914 | A1* | 2/2009 | Chagoly | G06F 11/3006 718/101 |
| 2010/0250701 | A1* | 9/2010 | Harvell | H04L 47/193 709/217 |
| 2011/0039580 | A1* | 2/2011 | Wigren | G01S 5/0252 455/456.1 |
| 2013/0066883 | A1* | 3/2013 | Tamura | G06F 16/24578 707/747 |
| 2013/0226971 | A1* | 8/2013 | Shoolman | H03M 7/3088 707/790 |
| 2013/0325862 | A1* | 12/2013 | Black | G06F 16/285 707/737 |
| 2014/0122565 | A1* | 5/2014 | Subramanian | H04L 41/5096 709/203 |
| 2014/0149537 | A1* | 5/2014 | Shankaran | H04L 67/2842 709/216 |
| 2015/0045054 | A1* | 2/2015 | Emadzadeh | H04W 4/33 455/456.1 |
| 2015/0106616 | A1* | 4/2015 | Nix | H04L 63/0442 713/156 |
| 2016/0055220 | A1* | 2/2016 | Joshi | G06F 3/04842 707/722 |
| 2016/0191509 | A1* | 6/2016 | Bestler | G06F 16/2255 713/163 |
| 2016/0212007 | A1* | 7/2016 | Alatorre | G06F 9/5066 |
| 2016/0335070 | A1* | 11/2016 | Aw | G06F 8/65 |
| 2017/0104651 | A1* | 4/2017 | Kakadia | H04L 43/0823 |
| 2017/0293766 | A1* | 10/2017 | Schnjakin | G06F 21/6218 |
| 2017/0331670 | A1* | 11/2017 | Parkvall | H04J 11/0056 |

* cited by examiner (ROUTING TABLE HELD IN NODES 210, 220, AND 230)

| NODE(n) | k | START | INTERVAL | SUCCESSOR | |
|---|---|---|---|---|---|
| | | | | ID | IP ADDRESS (NODE NAME) |
| 0 (210) (220) (230) | 1 | 1 | [1,2) | 2 | 192.168.1.2 (212) |
| | | | | | 192.168.2.2 (222) |
| | | | | | 192.168.3.2 (232) |
| | 2 | 2 | [2,4) | 2 | 192.168.1.2 (212) |
| | | | | | 192.168.2.2 (222) |
| | | | | | 192.168.3.2 (232) |
| | 3 | 4 | [4,1) | 4 | 192.168.1.4 (214) |
| | | | | | 192.168.2.4 (224) |
| | | | | | 192.168.3.4 (234) |

| STATUS | TRANSACTION | EXECUTION | VER. |
|---|---|---|---|
| SYNCHRONIZED | put Key#5 val05 | 401 | 001 |
| | put Key#6 val06 | 402 | 001 |
| | del Key#5 val05 | 403 | 002 |
| | put Key#7 val07 | 402 | 003 |
| NOT-YET-SYNCHRONIZED | put Key#5 val08 | 402 | |
| | get Key#5 | 401 | |

| k | START | INTERVAL | SUCCESSOR | |
|---|---|---|---|---|
| | | | ID | IP ADDRESS (NODE NAME) |
| 1 | 1 | [1,2) | 2 | 192.168.1.2 (212) |
| | | | | 192.168.2.2 (222) |
| | | | | 192.168.3.2 (232) |
| 2 | 2 | [2,4) | 2 | 192.168.1.2 (212) |
| | | | | 192.168.2.2 (222) |
| | | | | 192.168.3.2 (232) |
| 3 | 4 | [4,1) | 4 | 192.168.1.4 (214) |
| | | | | 192.168.2.4 (224) |
| | | | | 192.168.3.4 (234) |

| IP ADDRESS (NODE NAME) |
|---|
| 192.168.1.10 (210) |
| 192.168.1.2 (212) |

| IP ADDRESS (NODE NAME) |
|---|
| 192.168.2.10 (220) |
| 192.168.3.10 (230) |

| IP ADDRESS (NODE NAME) |
| --- |
| 192.168.1.6 (216) |
| 192.168.2.6 (236) |
| 192.168.3.7 (237) |
| ⋮ |
| 192.168.3.6 (236) |

FIG. 14

METHOD AND APPARATUS FOR INFORMATION MANAGEMENT

CROSS-REFERENCE TO RELATED APPLICATION

This application is based upon and claims the benefit of priority of the prior Japanese Patent Application No. 2016-116009, filed on Jun. 10, 2016, the entire contents of which are incorporated herein by reference.

FIELD

The embodiments discussed herein are related to a method and apparatus for information management.

BACKGROUND

The Internet of Things (IoT) is widely and increasingly prevalent, which provides communication capabilities to various devices in the world to thereby allow the devices to perform remote measurements and realize the utilization of information collected from them. In the use of the IoT technology, there are needs for the development of technologies enabling more efficient management of vast amounts of information collected by various kinds of devices and faster search for desired information.

In order to manage vast amount of information with great efficiency, there is a technology called autonomous distributed key-value store (KVS), which stores information pieces (values), each associated with a single key used in search operations, in a distributed manner across a plurality of locations (nodes). In such an autonomous distributed KVS system, an algorithm such as a Distributed Hash Table (DHT) or a Skip Graph is used in order to uniquely determine a node responsible for storing key-value pairs to thereby allow a search for the value associated with a given key.

In Chord, a DHT-based implementation, for example, each node is assigned, based on predetermined rules, to one of a plurality of identifiers (ID's) set in advance, and each key is assigned to a node according to the node assignment to the individual identifiers. That is, the node assignment and key assignment made in association with a node entry to or exit from the autonomous distributed KVS system are determined autonomously. Therefore, the autonomous distributed KVS system supports straightforward addition and removal of nodes, thereby providing high scalability.

There is a proposed technique for allowing flexible changes in data assignment by storing, in a node, key information and data in association with each other, managing the node in association with a range to which the hash value of the key information belongs, and making changes in the mapping of ranges to nodes in changing the storage location of the data. In addition, there is a proposed method of identifying the range to which the key of data stored in a node having exited (lost data) belongs by using information for managing the increase or decrease in nodes. Further, there is a proposed method of determining, in storing registration information pieces each including a key and original data of a data item corresponding to the key in DHT nodes, the order of the registration information pieces according to hash values of the keys and determining registration information pieces to be stored in the same node based on the determined order.

See, for example, the following documents:
Japanese Laid-open Patent Publication No. 2013-61739
Japanese Laid-open Patent Publication No. 2015-35182
Japanese Laid-open Patent Publication No. 2009-20757
David Karger et al., "Consistent Hashing and Random Trees: Distributed Caching Protocols for Relieving Hot Spots on the World Wide Web", Proceedings of the twenty-ninth annual ACM symposium on Theory of computing (STOC '97), May 1997.

In an autonomous distributed KVS system, key-value (KV) pairs stored in a node are lost as the node exits. Therefore, the autonomous distributed KVS system replicates key-value pairs and stores the copies in a plurality of nodes, as in the above-mentioned proposed technique of Karger et al., to thereby prevent the loss of the key-value pairs. However, if frequent node entries and exits occur, high communication load between nodes (inter-node communication load) involved in replicating key-value pairs to other nodes is imposed.

In addition, each node entry or exit entails an update of information used for node searching. Therefore, frequent node entries and exits may result in high processing load of nodes. For example, in a system having, as its nodes, mobile terminals likely to enter and exit frequently, their communication environments may change over a short period of time and it may therefore frequently occur that a node having once exited re-enters the system shortly after the exit. Executing, for each re-entry, the same processing as for a new entry (such as replication of key-value pairs) may cause the inter-node communication load and the processing load of nodes to increase, leading to decreased performance of the system.

SUMMARY

According to one embodiment, there is provided a non-transitory computer-readable storage medium storing an information management program that causes a processor of a computer including a memory and the processor to perform a procedure. The procedure includes storing, in a management table residing in the memory and used to manage a system that stores key-data pairs, each including a key obtained by application of a predetermined function and data associated with the key, in such a way as to be distributed among a plurality of nodes, information on an identifier common to a plurality of systems, one or more keys commonly assigned to the identifier, and nodes assigned to the identifier; and reflecting, when a node whose assignment to the identifier has been once cancelled is reassigned to the identifier, the reassignment of the node into the management table, and implementing synchronization of one or more key-data pairs corresponding to the keys assigned to the identifier between the reassigned node and remaining nodes assigned to the identifier.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a routing table held in each node according to the second embodiment;

FIG. 10 illustrates an example of a transaction history according to the second embodiment;

FIG. 11 illustrates an example of the routing table according to the second embodiment;

FIG. 12 illustrates an example of an initial node list according to the second embodiment;

FIG. 13 illustrates an example of a same identifier node list according to the second embodiment;

FIG. 14 illustrates an example of node pool information according to the second embodiment;

DESCRIPTION OF EMBODIMENTS

Figure 1:
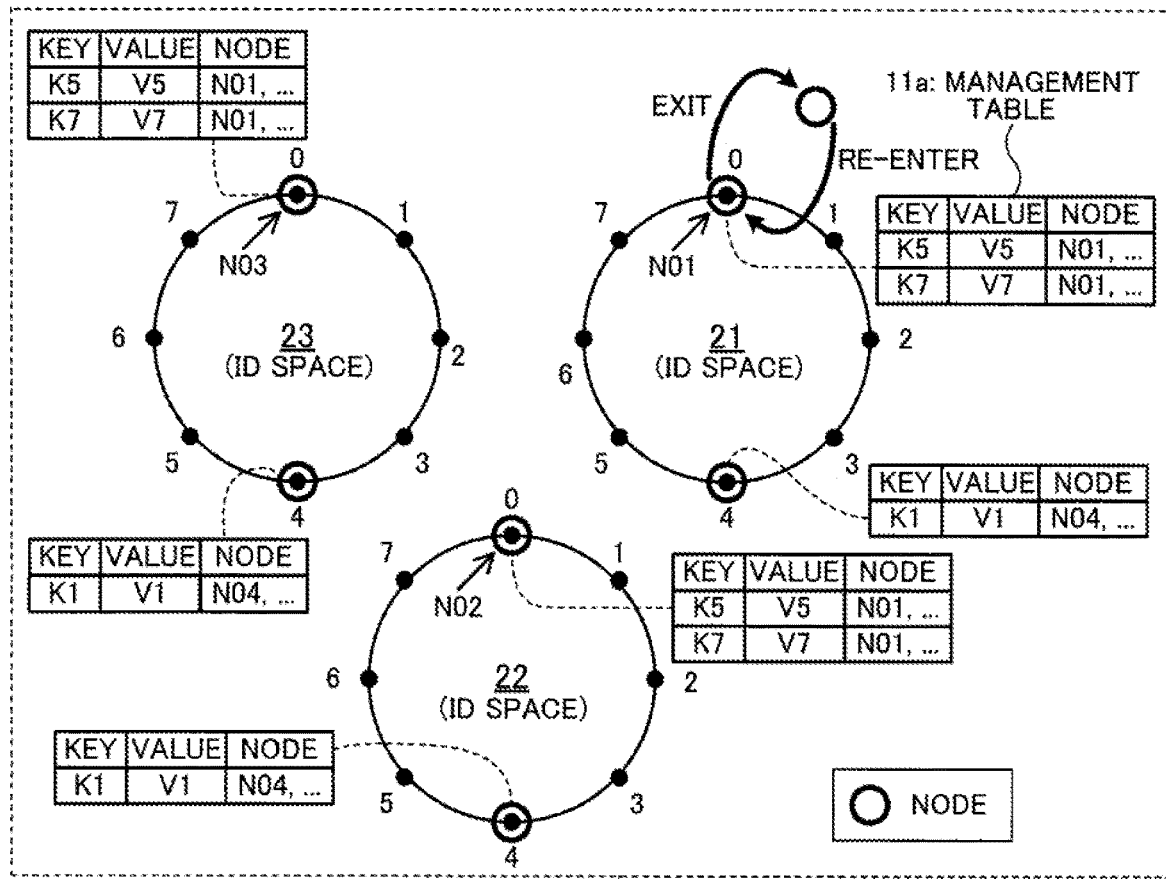
FIG. 1 illustrates an example of an information management device according to a first embodiment.
Figure 1:
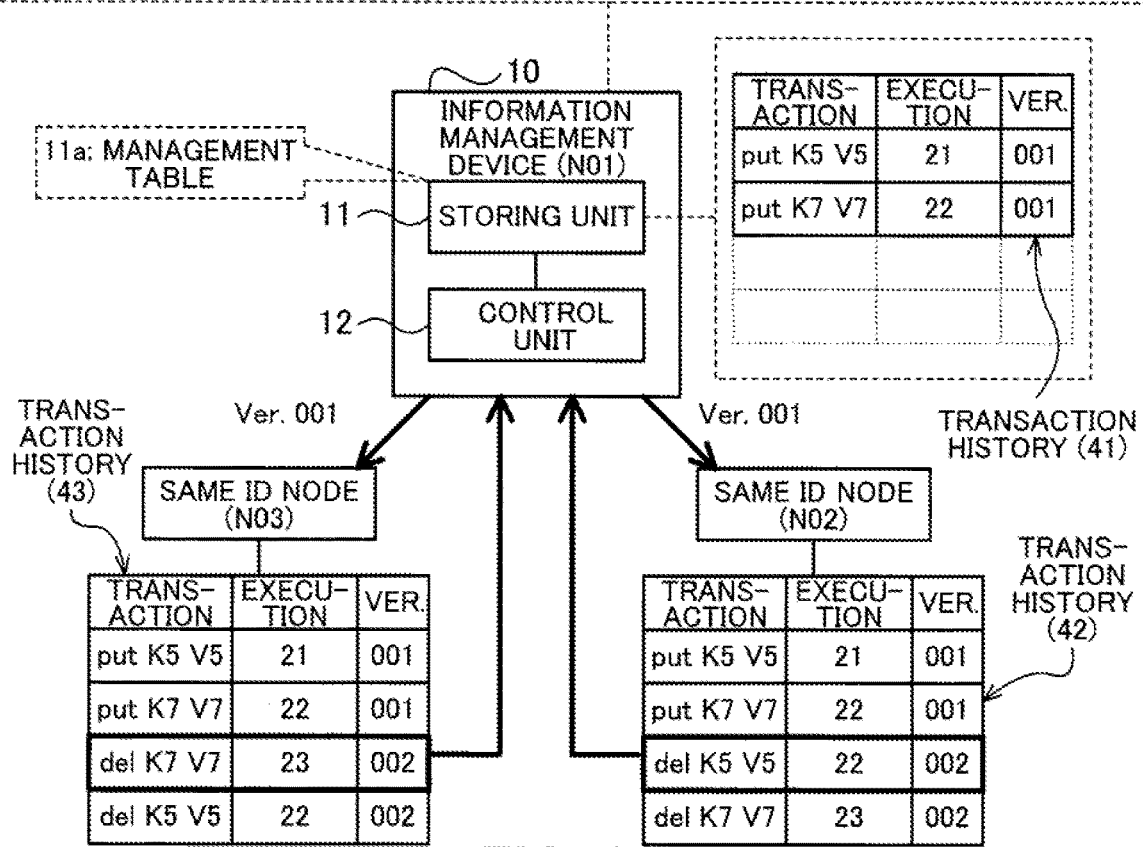

Several embodiments will be described below with reference to the accompanying drawings. In the following description and the accompanying drawings, like reference numerals refer to like elements having substantially the same functions, and a repeated description thereof may be omitted.

(a) First Embodiment

A first embodiment is described next with reference to FIG. 1. The first embodiment is directed to a technique for preventing the loss of information due to a node exit in a system implementing an autonomous distributed KVS using, for example, a DHT. The first embodiment further relates to a mechanism for reducing inter-node communication load and processing load of nodes at the time of each node exit even if there are nodes likely to frequently repeat system entries and exits.

Note that FIG. 1 illustrates an example of an information management device according to the first embodiment. An information management device 10 of FIG. 1 is one such example of the first embodiment. In addition, the information management device 10 is one of nodes responsible for managing node entries and exits. Nodes responsible for managing node entries and exits are hereinafter referred to as "initial nodes". In the example of FIG. 1, the information management device 10 corresponds to a node N01.

As illustrated in FIG. 1, the information management device 10 includes a storing unit 11 and a control unit 12. The storing unit 11 is a volatile storage device such as random access memory (RAM), or a non-volatile storage device such as a hard disk drive (HDD) or flash memory. The control unit 12 is a processor such as a central processing unit (CPU) or digital signal processor (DSP). Note however that the control unit 12 may be an electronic circuit, such as an application specific integrated circuit (ASIC) or field programmable gate array (FPGA). The control unit 12 executes a program stored, for example, in the storing unit 11 or different memory.

The information management device 10 manages nodes each storing information (values) corresponding to keys assigned to the node. The nodes are, for example, mobile terminals such as mobile phones and smartphones, in-vehicle terminals such as car navigation systems, or information processors such as personal computers and servers. In addition, each node has a function of communicating with other nodes using a network, such as a local area network (LAN) and the Internet.

The control unit 12 assigns each node to an identifier (ID) of an identifier space in which a plurality of identifiers are laid out and then assigns one or more keys to each node based on the node assignment in the identifier space, to thereby enable a node responsible for a given key to be identified by its identifier. Note that a single node may be assigned to each of the identifiers in the identifier space. In addition, a set of nodes assigned to a single identifier space forms one system.

FIG. 1 illustrates three identifier spaces 21, 22, and 23. The identifier space 21 is viewed as a ring with eight black dots, for example. The number near each black dot is the identifier corresponding to the location of the black dot. The circle surrounding a black dot represents a node assigned to the identifier corresponding to the black dot. In the example of FIG. 1, the node N01 is assigned to an identifier of "0" in the identifier space 21.

The control unit 12 manages nodes using the identifier spaces 21, 22, and 23 having the same identifier arrangement. That is, the control unit 12 manages a plurality of systems individually corresponding to each of the identifier spaces 21, 22, and 23. As illustrated in FIG. 1, each of the identifier spaces 22 and 23 is viewed as a ring with eight black dots, and the identifier corresponding to the same location in the identifier space 21 is set for the location of each black dot.

Note that FIG. 1 illustrates an example of using three identifier spaces; however, the number of identifier spaces used may be two, or four or more. In addition, each of the identifier spaces of the example of FIG. 1 is represented as an identifier space of Chord, which is a DHT, for the purpose of illustration; however, the identifier space representation may be modified according to the type of an algorithm used. That is, a modification of the identifier space representation is allowed to the extent that the technique of the first embodiment for implementing multiple identifier spaces is applicable.

The storing unit 11 stores the synchronization state of information held in nodes assigned to the same identifier in a plurality of systems individually corresponding to each of the identifier spaces 21, 22, and 23. The nodes assigned to the same identifier in the identifier spaces 21, 22, and 23 store one or more of the same key-value pairs, in each of which a key and a value are associated with each other. In the case where a node receives a request with designation of a given key for a transaction to be performed on the value associated with the key (a KVS transaction), the KVS transaction is performed by a node responsible for the designated key. Then, the node having handled the KVS transaction accumulates a record of the performed KVS transaction (a transaction record) in its transaction history.

In addition, according to the first embodiment, when a node has performed a KVS transaction, the content of the transaction is sent to all other nodes assigned to the same identifier as that to which the node is assigned. Upon receiving the content, each of the nodes performs a KVS transaction according to the sent content and, then, accumulates a record of the performed KVS transaction (a transaction record) in its transaction history. That is, the transaction record is synchronized among all the nodes assigned to the same identifier. Further, each of the nodes stores the synchronization state of the transaction record. For example, each node adds a version number used to manage the synchronization state, within its transaction history, to a set of transactions for which completion of synchronization has been confirmed.

In the example of FIG. 1, the storing unit 11 of the information management device 10 corresponding to the node N01 stores, as a transaction history 41, a storing transaction (put) for storing a value V5 in association with a key K5 and a storing transaction (put) for storing a value V7 in association with a key K7. Assume in this situation that the node N01 exits the system corresponding to the identifier space 21. The transaction history 41 held in the node N01 is not updated while the node N01 remains off the system even if the nodes N02 and N03 assigned to the same identifier execute KVS transactions.

According to the autonomous distributed KVS system of the first embodiment, even if, amongst a plurality of nodes assigned to the same identifier, one or more nodes exit, the remaining nodes continue operations if the number of the remaining nodes is equal to or more than a predetermined number (for example, 2). Then, if a node having once exited re-enters when the remaining nodes continuously run the operations, the operations are continued while assigning the re-entered node to the same identifier as before the exit. With such a mechanism, even if nodes frequently repeat enters and exits, it is possible to reduce load involved in, for example, updating information used to search for a node responsible for a given key (routing tables), thus effectively preventing decreased system performance.

Note that, in the case where one or more of the remaining nodes assigned to the same identifier as that to which the re-entering node is assigned have executed KVS transactions during the re-entering node remaining off its system, synchronization of the KVS transactions takes place when the node re-enters. One suitable method to implement the synchronization is for the re-entering node to acquire appropriate transaction records from the other nodes assigned to the same identifier. For example, when the node N02 has executed a deleting transaction (del) for deleting the value V5 associated with the key K5 during the node N01 remaining off its system, the deleting transaction is reflected into a transaction history 42 of the node N02. In addition, when the node N03 has executed a deleting transaction (del) for deleting the value V7 associated with the key K7, the deleting transaction is reflected into a transaction history 43 of the node N03. Then, the content of these deleting transactions is synchronized between the nodes N02 and N03 and reflected into the transaction histories 42 and 43. Subsequently, synchronization confirmation is implemented between the nodes N02 and N03, and the synchronization state (a version number "Ver. 002") is added to each of the transaction histories 42 and 43.

After that when the node N01 is reassigned to the same identifier, "0", as before the exit, the control unit 12 synchronizes the information held in the nodes N02 and N03 assigned to the same identifier, "0", with the information held in the node N01 reassigned thereto. In this regard, the control unit 12 notifies the nodes N02 and N03 of synchronization state information (Ver. 001) to ask each of the nodes N02 and N03 for the difference in their transaction histories.

The nodes N02 and N03 refer to the transaction histories 42 and 43, respectively, and identify transactions performed later than those in the transaction history 41 of the node N01 based on the notified synchronization state information (Ver. 001). In the example of FIG. 1, transactions with the new synchronization state information (Ver. 002) added thereto (i.e., the deleting transactions performed during the node N01 remaining off its system) are identified. In this case, the node N02 notifies the node N01 of its own deleting transaction for the key K5 as the difference. Similarly, the node N03 notifies the node N01 of its own deleting transaction for the key K7 as the difference. Upon receiving the difference as information on transactions yet to be synchronized, the control unit 12 adds the content of the notified transactions to the transaction history 41 stored in the storing unit 11. Then, the control unit 12 reflects the transactions added to the transaction history 41 into its own keys and values.

As described above, the information management method of the first embodiment is implemented as a mechanism of performing the following first and second processes by a computer. The computer manages a system that stores key-data pairs, each including a key obtained by the application of a predetermined function and data associated with the key, in such a way as to be distributed among a plurality of nodes. The first process is to store, in a management table 11a, information on an identifier common to a plurality of systems, one or more keys commonly assigned to the identifier, and nodes assigned to the identifier. The second process is to reflect, when a node whose assignment to the identifier has been once cancelled is reassigned to the identifier, the reassignment of the node into the management table 11a and then synchronize the key-data pairs between the reassigned node and other nodes assigned to the same identifier.

As has been described above, the autonomous distributed KVS system of the first embodiment includes a plurality of systems with the identical node assignment, in which nodes assigned to the same identifier are assigned the same key or keys. In addition, because the sequence of the identifiers set in the identifier space of each system is the same, a transaction on information associated with a designated key is reflected in a corresponding node of each system based on an identifier. Therefore, it is easy to implement synchronization of key-value pairs and node relationships among the systems.

This results in practically creating the same condition as if there are replicated systems. Thus, even if one or more nodes exit their systems, nodes on other systems hold information, and it is therefore possible to prevent loss of the information due to the node exits. In addition, the application of the technique according to the first embodiment eliminates the need for a plurality of nodes assigned within the same identifier space to hold the same information for the purpose of backup. As a result, it is possible to avoid the burden, for example, involved in transferring information for backup between nodes and updating routing tables when a node enters or exits.

As a consequence, even if there are nodes frequently repeating entries and exits, an increase in the communication and processing load caused when the nodes enter and exit is reduced. In addition, by allowing operations to be continued while assigning a node having temporarily exited to the same identifier as before the exit, the first embodiment effectively achieves such a reduction in the communication and processing load. Further, each node holds the synchronization state of its transaction history. This facilitates identification of the difference between the transaction history of the re-entering node and that of each of other nodes assigned to the same identifier when the re-entering node receives transaction records from the other node as the difference. That is, because only the difference in the transaction histories needs to be sent between the nodes, it is possible to reduce the communication and processing load. The first embodiment has been described thus far.

(b) Second Embodiment

A second embodiment is directed to a technique for preventing the loss of information due to a node exit in a system implementing an autonomous distributed KVS using, for example, a DHT. The second embodiment further relates to a mechanism for reducing inter-node communication load and processing load of nodes at the time of each node exit even if there are nodes likely to frequently repeat system entries and exits.

b-1. Example of Autonomous Distributed KVS System

The autonomous distributed KVS system employs a technique, such as a DHT, that allows locating a node storing a value corresponding to a designated key. Next described are Chord, which is a DHT-based implementation, and other techniques applicable to the autonomous distributed KVS system. Note that the Chord algorithm is presented here as a major example for the purpose of illustration; however, the application of the technique according to the second embodiment is not limited to this.

[Chord]

Figure 2:
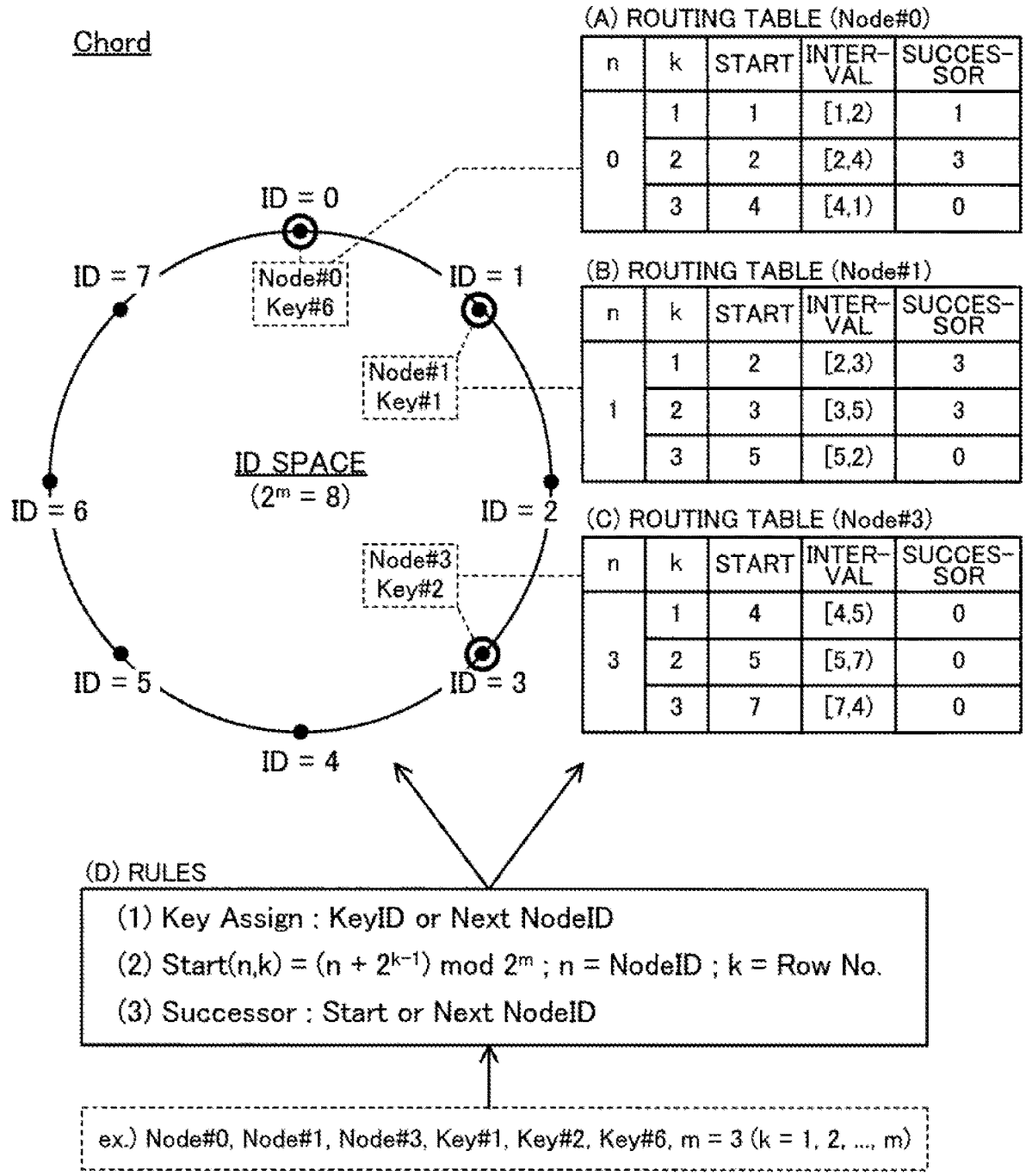
FIG. 2 is a first diagram illustrating an example of an autonomous distributed KVS system (Chord)
Figure 3:
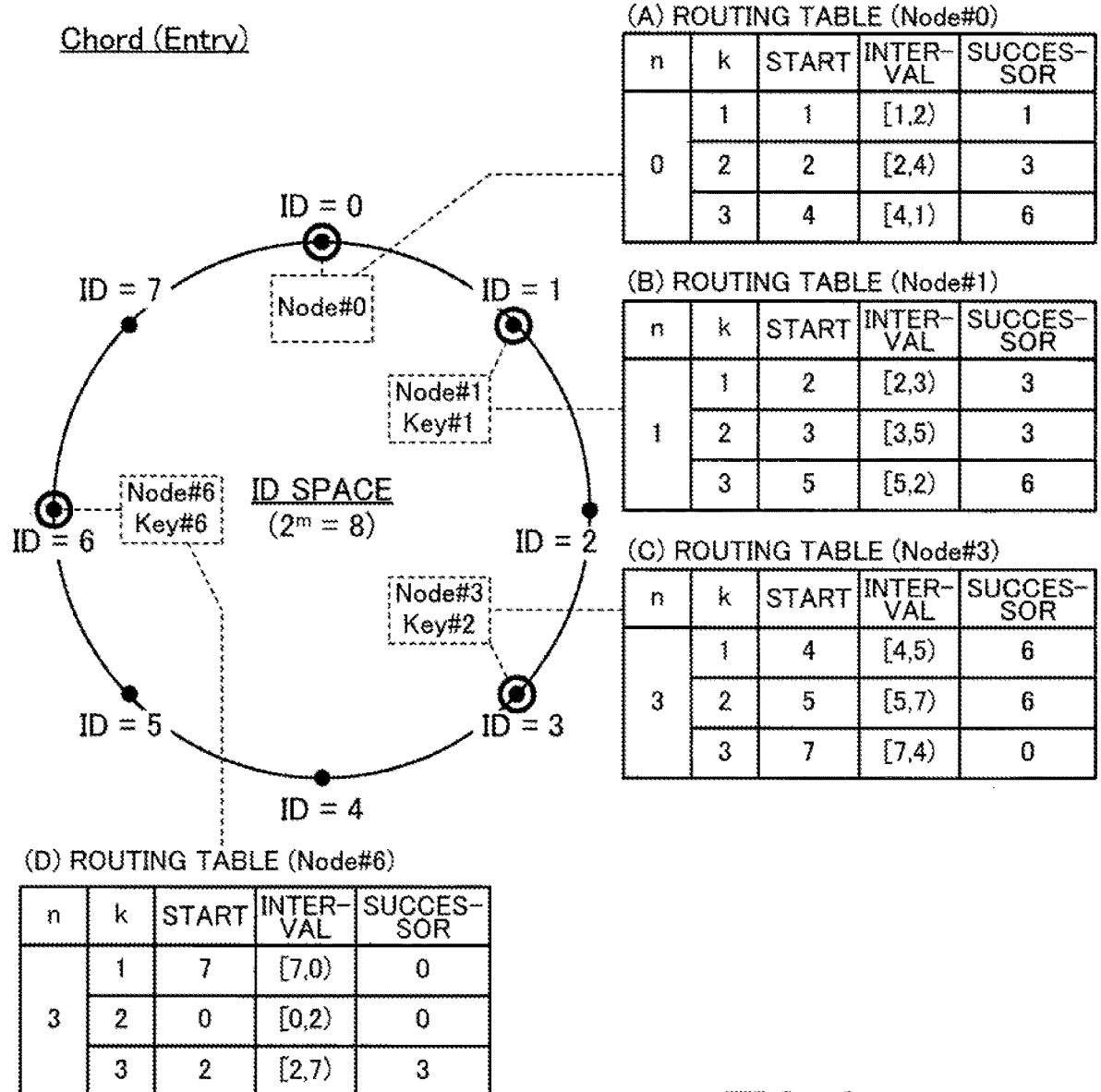
FIG. 3 is a second diagram illustrating the example of the autonomous distributed KVS system (Chord)
Figure 4:
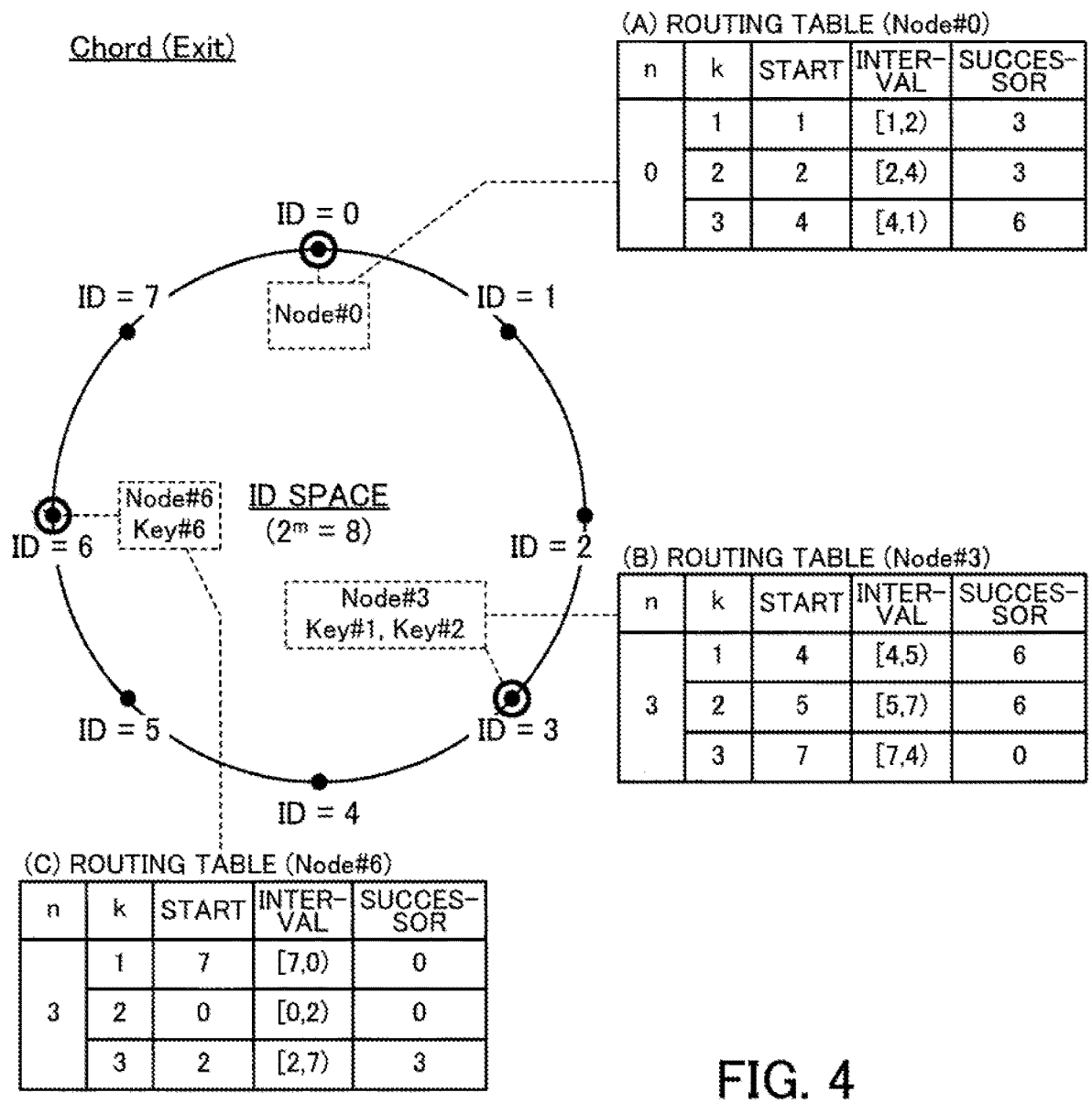
FIG. 4 is a third diagram illustrating the example of the autonomous distributed KVS system (Chord)

Next described is the Chord algorithm (hereinafter simply referred to as "Chord") applicable to implementation of the autonomous distributed KVS system with reference to FIGS. 2 to 4. FIG. 2 is a first diagram illustrating an example of an autonomous distributed KVS system (Chord). FIG. 3 is a second diagram illustrating the example of the autonomous distributed KVS system (Chord). FIG. 4 is a third diagram illustrating the example of the autonomous distributed KVS system (Chord).

Chord implements a mechanism of uniquely locating a node to which a given key has been assigned by allocating identifiers across an identifier space having a ring structure and determining the assignment of each node to an identifier and the assignment of a key to each node based on defined rules. The example of FIG. 2 illustrates a scheme for assigning three nodes (Node #0, Node #1, and Node #3) across an identifier space with m-bit (m=3) identifiers. In addition, the example of FIG. 2 illustrates a scheme for assigning three keys (Key #1, Key #2, and Key #6) to the nodes. Node # i (i=0, 1, or 3) is assigned to a location of "ID=i" (hereinafter denoted by ID # i). Note that an identifier to which Node # i has been assigned is sometimes denoted by NodeID. In addition, the identifier of Key # j is "j", and the identifier is sometimes denoted by KeyID.

When, in Chord, Key # j is assigned to a node in the identifier space, if a node has been assigned to ID # j (an identifier having the same value as KeyID), Key # j is assigned to the node. On the other hand, if a node is not assigned to ID # j, the first identifier to which a node is assigned (Next NodeID) is identified among identifiers found in clockwise direction along the ring after ID # j, and Key # j is assigned to the node assigned to Next NodeID. In the example of FIG. 2, because Node #1 has been assigned to ID #1, Key #1 is assigned to Node #1. In addition, because a node is not assigned to ID #2, Key #2 is assigned to Node #3 having been assigned to ID #3, which is the first identifier with a node assigned thereto found in clockwise direction after ID #2. In like fashion, because a node is not assigned to ID #6, Key #6 is assigned to Node #0 having been assigned to ID #0, which is the first identifier with a node assigned thereto found in clockwise direction after ID #6.

Node #0, Node #1, and Node #3 individually have a routing table used to look up Key #1, Key #2, and Key #6. Each routing table has information on ranges each including KeyID of a key for lookup (intervals); and nodes each responsible for the corresponding key (successors). For example, (A) in FIG. 2 is a routing table held in Node #0. In Chord, each routing table contains m intervals and identifiers of successors corresponding to the individual intervals. Each interval is calculated based on NodeID (n) and a row number (k) of the routing table. The starting point of an interval (Start(n, k)) is obtained by the following equation (1):

$$\text{Start}(n,k)=(n+2^{k-1}) \bmod 2^m \quad (1)$$

Then, each interval is defined as a range equal to or more than Start(n, k) and less than Start(n+1, k). For example, in the case of n=0 and k=1, Start (0, 1) is 1 and Start (1, 1) is 2. Therefore, the interval in the first row of the routing table held in Node #0 is defined as a range equal to or more than 1 and less than 2.

As for each successor (abbreviated to "Suc." in the figures), in the case where a node is assigned to an identifier having the same numerical value as that of Start, the successor takes the same numerical value as that of Start. On the other hand, in the case where no node is assigned to an identifier having the same numerical value as that of Start, the successor takes the same numerical value as the first identifier with a node assigned thereto (Next NodeID) found in clockwise direction along the ring after the identifier having the same numerical value as that of Start. For example, in the case of n=0 and k=1, the successor is 1.

Further by obtaining intervals and successors for k=2 and 3, the routing table (A) in FIG. 2 is configured. Note that (B) in FIG. 2 is a routing table held in Node #1 and (C) in FIG. 2 is a routing table held in Node #3.

For example, upon receiving a request for a transaction on a value associated with Key #2, Node #0 refers to its routing table and then identifies the interval ([2, 4)) including a KeyID of "2". Subsequently, Node #0 notes that a successor corresponding to the identified interval (Node #3 having been assigned to ID #3) is responsible for Key #2, and requests Node #3 to execute the requested transaction.

As described above, Chord has a mechanism of allowing the assignment of each key to be determined based on the assignment of nodes to the identifiers so that each node is able to locate a node responsible for a given key. Each node has a routing table including intervals preliminarily calculated based on the node assignment as well as successors. The routing table is used to search for a node responsible for a given key, and the node found by the search then executes a requested transaction on the value associated with the key.

In the case where a new node is added to the identifier space (a node entry), the routing tables of at least some of the nodes in the identifier space are updated. In addition, because there is a change in the node assignment, the assignment of keys may also be updated. For example, as illustrated in FIG. 3, when Node #6 newly enters, Key #6 is assigned to Node #6. Then, within the routing table held in Node #0, the successor in the third row is changed to "6" (see (A) in FIG. 3). Within the routing table held in Node #1, the successor in the third row is changed to "6" ((B) in FIG. 3). Within the routing table held in Node #3, the successors in the first and second rows are changed to "6" ((C) in FIG. 3).

Procedures for calculating the routing table of Node #6 ((D) in FIG. 3) and the routing tables of Node #0, Node #1, and Node #3 are the same as those for calculating the routing tables illustrated in FIG. 2. Thus, in response to a node entry, key reassignment and routing table updates are performed. In addition, when a node exits the identifier space (a node exit), key reassignment and routing table updates are performed as represented in FIG. 4 (which illustrates an example where Node #1 exits).

[Other Techniques]

Other than Chord above, DHT's called Content Addressable Network (CAN), Pastry, and Kademlia are also employed as mechanisms for efficiently locating a node responsible for a given key. CAN employs an n-dimensional torus as a logical space (corresponding to an identifier space in Chord) to which keys are mapped. Pastry employs the Pastry algorithm as a logical space. Kademlia employs a binary tree as a logical space. In addition, other than various DHT's, Skip Graph may be used instead to implement an autonomous distributed KVS system. The technique according to the second embodiment is widely applicable to autonomous distributed KVS systems employing these various mechanisms.

b-2. Multiple Distributed KVS System

Figure 5:
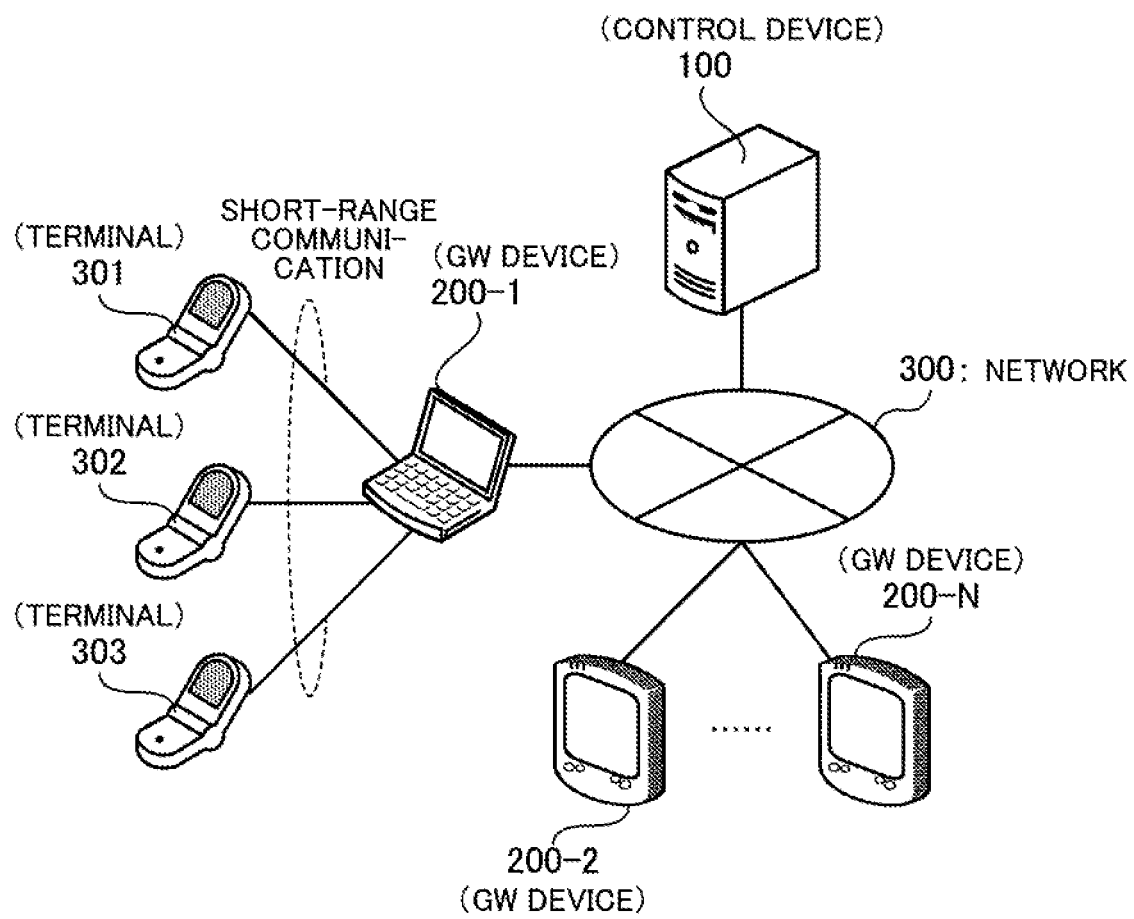
FIG. 5 illustrates an example of a multiple distributed KVS system according to a second embodiment.
Figure 6:
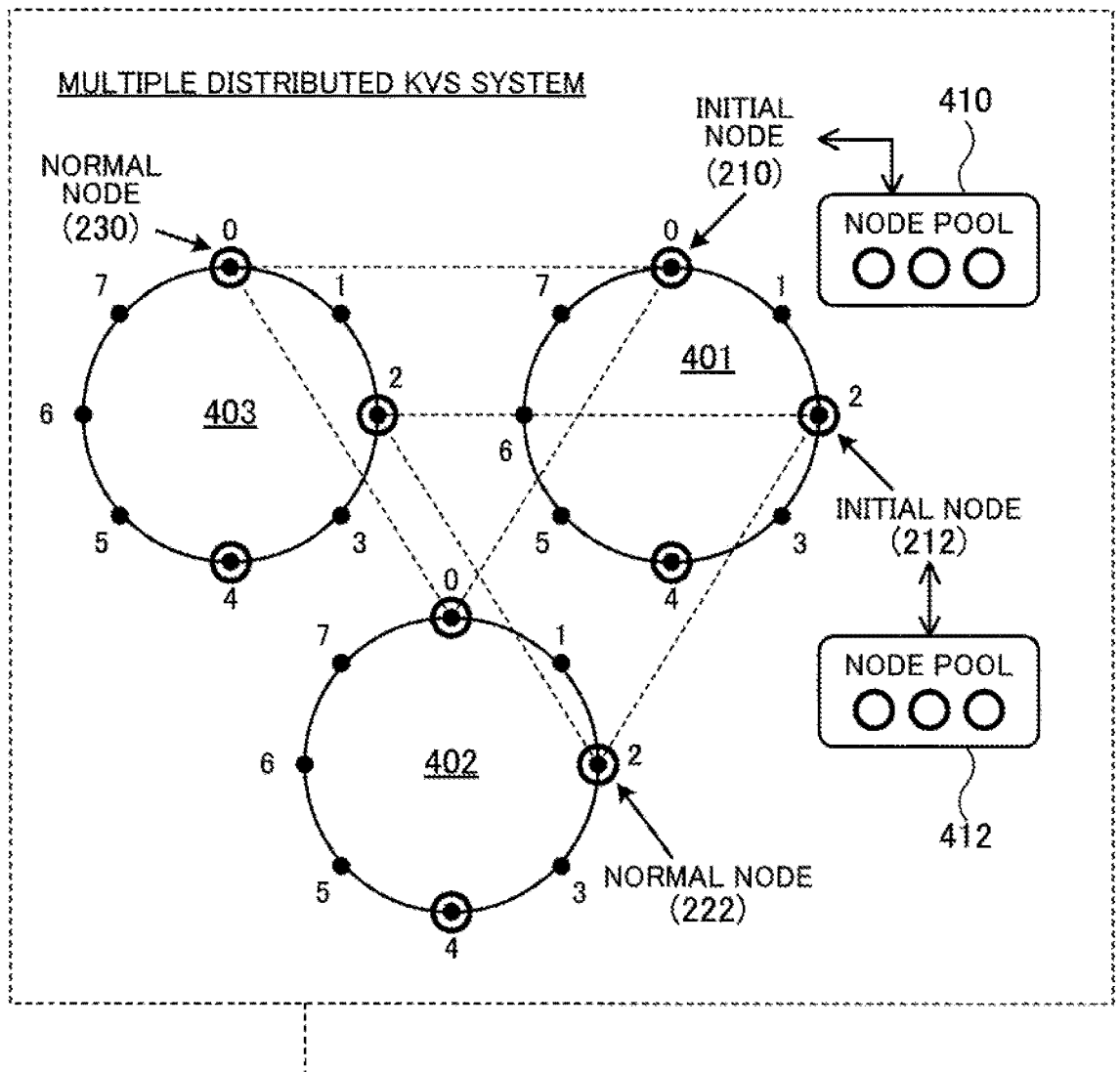
FIG. 6 illustrates node management taking place in the multiple distributed KVS system according to the second embodiment.

Next described is a multiple distributed KVS system according to the second embodiment with reference to FIGS. 5 to 7. FIG. 5 illustrates an example of the multiple distributed KVS system according to the second embodiment. FIG. 6 illustrates node management taking place in the multiple distributed KVS system according to the second embodiment. FIG. 7 illustrates an example of a routing table held in each node according to the second embodiment.

As illustrated in FIG. 5, the multiple distributed KVS system of the second embodiment includes, for example, a control device 100, gateway (GW) devices 200-1, 200-2, ..., 200-N, and terminals 301, 302, and 303. The control device 100 is a computer such as a personal computer and a server. The gateway devices 200-1, 200-2, ..., 200-N and the terminals 301, 302, and 303 are mobile terminals, such as personal computers, mobile phones, smartphones, car navigation systems, and tablet terminals. The control device 100 and the gateway devices 200-1, 200-2, ..., 200-N are able to communicate with each other via a network 300. The gateway device 200-1 is able to communicate with the terminals 301, 302, and 303 using short-range communication such as Bluetooth (registered trademark) or BT.

Each of the control device 100, the gateway devices 200-1, 200-2, ..., 200-N, and the terminals 301, 302, and 303 is identified by identification information, such as a Uniform Resource Identifier (URI) and an Internet Protocol (IP) address. At least some of the gateway devices 200-1, 200-2, ..., 200-N, and the terminals 301, 302, and 303 have functions of, for example, a Global Positioning System (GPS), a temperature sensor, or an acceleration sensor, and are able to hold information acquired using such functions (sensed information).

For example, each of the terminals 301, 302, and 303 individually transmits the type and characteristics of its sensed information and its own identification information piece to the gateway device 200-1 using short-range communication. The gateway device 200-1 holds the identification information piece of each of the terminals 301, 302, and 303 in association with one or more keys. In addition, each of the gateway devices 200-2, ..., 200-N individually acquires and holds sensed information, and holds its own identification information piece in association with one or more keys. In this case, the gateway devices 200-1, 200-2, ..., 200-N individually function as nodes of an autonomous distributed KVS system, and the identification information pieces each indicating a storage location of sensed information are values to be associated with keys.

The control device 100 is configured to set one or more nodes for managing node entries and exits to and from the autonomous distributed KVS system (initial nodes) and notify other nodes of information on the initial nodes. For example, the control device 100 has a function of a Web server, and notifies the other nodes of the information on the initial nodes using the function. Note that FIG. 5 merely illustrates an example of a system to which the technique of the second embodiment is applicable, and the scope of the application is not limited to this case. Note however that, in the following description, the gateway devices 200-1, 200-2, ..., 200-N are referred to as nodes for the purpose of illustration.

[Node Types and Assignment, Key Assignment, and Routing Tables]

There are two types of nodes, initial and normal nodes. Each initial node has a function of managing node entries and exits (a management function). Each normal node lacks the management function of the initial node. Initial nodes are preliminarily designated by the control device 100. In addition, the control device 100 notifies individual nodes of information on identifiers to each of which an initial node is assigned. Nodes other than initial nodes are all normal nodes.

The example of FIG. 6 illustrates node assignment in the multiple distributed KVS system according to the second embodiment. As illustrated in FIG. 6, the multiple distributed KVS system uses a plurality of identifier spaces 401, 402, and 403. The identifier spaces 401, 402, and 403 individually have the same m-bit identifier sequence (m=3;

and ID=0, 1, ..., 7). In addition, control is exercised in such a manner that the identifier spaces 401, 402, and 403 share a common node assignment. For example, an initial node 210 is assigned to ID #0 of the identifier space 401. In this case, nodes (normal nodes 220 and 230 in the example of FIG. 6) are individually assigned to ID #0 of the identifier spaces 402 and 403. The identical ID sequence is laid out in each of the identifier spaces 401, 402, and 403, and the identical node assignment is made for the identifier spaces 401, 402, and 403. Therefore, the same key-value pairs are stored in nodes assigned to the same identifier.

In the example of FIG. 6, in the identifier space 401, the initial node 210 is assigned to ID #0; an initial node 212 is assigned to ID #2; and a normal node 214 is assigned to ID #4. In the identifier space 402, the normal node 220 is assigned to ID #0; a normal node 222 is assigned to ID #2; and a normal node 224 is assigned to ID #4. In the identifier space 403, the normal node 230 is assigned to ID #0; a normal node 232 is assigned to ID #2; and a normal node 234 is assigned to ID #4. For example, when Key #0, Key #1, ..., Key #7 are prepared as keys to be assigned to nodes, the nodes individually assigned to ID #0 are made responsible for Key #5, Key #6, Key #7, and Key #0. The nodes individually assigned to ID #2 are made responsible for Key #1 and Key #2. The nodes individually assigned to ID #4 are made responsible for Key #3 and Key #4. Then, a value is associated with each of these keys, and, using such a key, a transaction is performed on the associated value. Note that rules of Chord (see (D) in FIG. 2) are employed here as an example of how to assign keys.

Thus, the multiple distributed KVS system of the second embodiment adopts a mechanism of redundantly storing key-value pairs of each node by managing a plurality of identifier spaces with the identical ID sequence laid out therein and assigning multiple nodes to the same identifier. In order to implement this mechanism, the initial nodes 210 and 212 manage node pools 410 and 412, respectively, as illustrated in FIG. 6. The node pools 410 and 412 are used to temporarily house nodes requesting entry into the system and keep them waiting for assignment to identifiers.

Note that the initial nodes 210 and 212 exchange information to share the same content between the node pools 410 and 412. In the example of FIG. 6, the initial nodes 210 and 212 manage the node pools 410 and 412, respectively; however, this may be modified in such a manner that either one or both of the initial nodes 210 and 212 manage a single, common node pool provided for them. For example, when the initial node 210 receives an entry request from a node, the initial node 210 temporarily houses the entry-requesting node in the node pool 410. Then, the initial node 210 determines whether the number of nodes housed in the node pool 410 is larger than the number of identifier spaces (3 in the example of FIG. 6). If the number of nodes being housed is larger than the number of identifier spaces, the initial node 210 selects, from the node pool 410, nodes as many as the number of identifier spaces and, then, allocates the same identifier to each of the selected nodes. Subsequently, the initial node 210 assigns each of the ID-allocated nodes to the corresponding identifier in one of the identifier spaces 401, 402, and 403. This method enables the identical node assignment across the identifier spaces 401, 402, and 403 to be maintained even after the new node entry.

Each node of the multiple distributed KVS system according to the second embodiment has occasion to access a node in an identifier space different from one to which the node belongs. Therefore, each node has a routing table including information on nodes belonging to different identifier spaces. For example, the nodes assigned to ID #0 (i.e., the initial node 210 and the normal nodes 220 and 230) individually have a routing table illustrated in FIG. 7. The routing table according to the second embodiment includes columns of the following items, as illustrated in FIG. 7: an identifier to which the nodes have been assigned (NodeID: n); row number k; start; interval; and successor.

The routing table of FIG. 7 is different from that of (A) in FIG. 2 in including, in the successor column, information on nodes belonging to different identifier spaces. In the example of FIG. 7, the successor column contains entries of identifiers for identifying successors, and entries of information (IP addresses) used to access the successors in the individual identifier spaces. For example, when n=0 and k=1, the identifier of the successors is 2. The nodes assigned to ID #2 in the identifier spaces 401, 402, and 403 are the initial node 212 and the normal nodes 222 and 232, respectively. Therefore, the successor column contains entries of IP addresses of the initial node 212 and the normal nodes 222 and 232.

FIG. 7 illustrates an example of a routing table held in the nodes assigned to ID #0; however, each node assigned to another identifier holds a routing table corresponding to the node. Therefore, when a node in an identifier space receives a transaction request, the node is able to not only locate a transaction-target node within its own identifier space, but also locate transaction-target nodes deployed in the other identifier spaces. Then, with the use of the above-described routing table, it is possible to send the transaction request to, amongst the transaction target nodes, one in a good communication state. In addition, even when one of the transaction-target nodes has exited its own identifier space, a transaction-target node in a different identifier space is instead able to perform the requested transaction. Therefore, the system operations are continued without needing extra processing steps. Further, in the case where a node having once exited re-enters, it is possible to quickly restore the node to its former state by assigning the node to an identifier to which the node was assigned before the exit and performing synchronization with other nodes assigned to the same identifier. The multiple distributed KVS system has been described thus far.

b-3. Hardware

Figure 8:
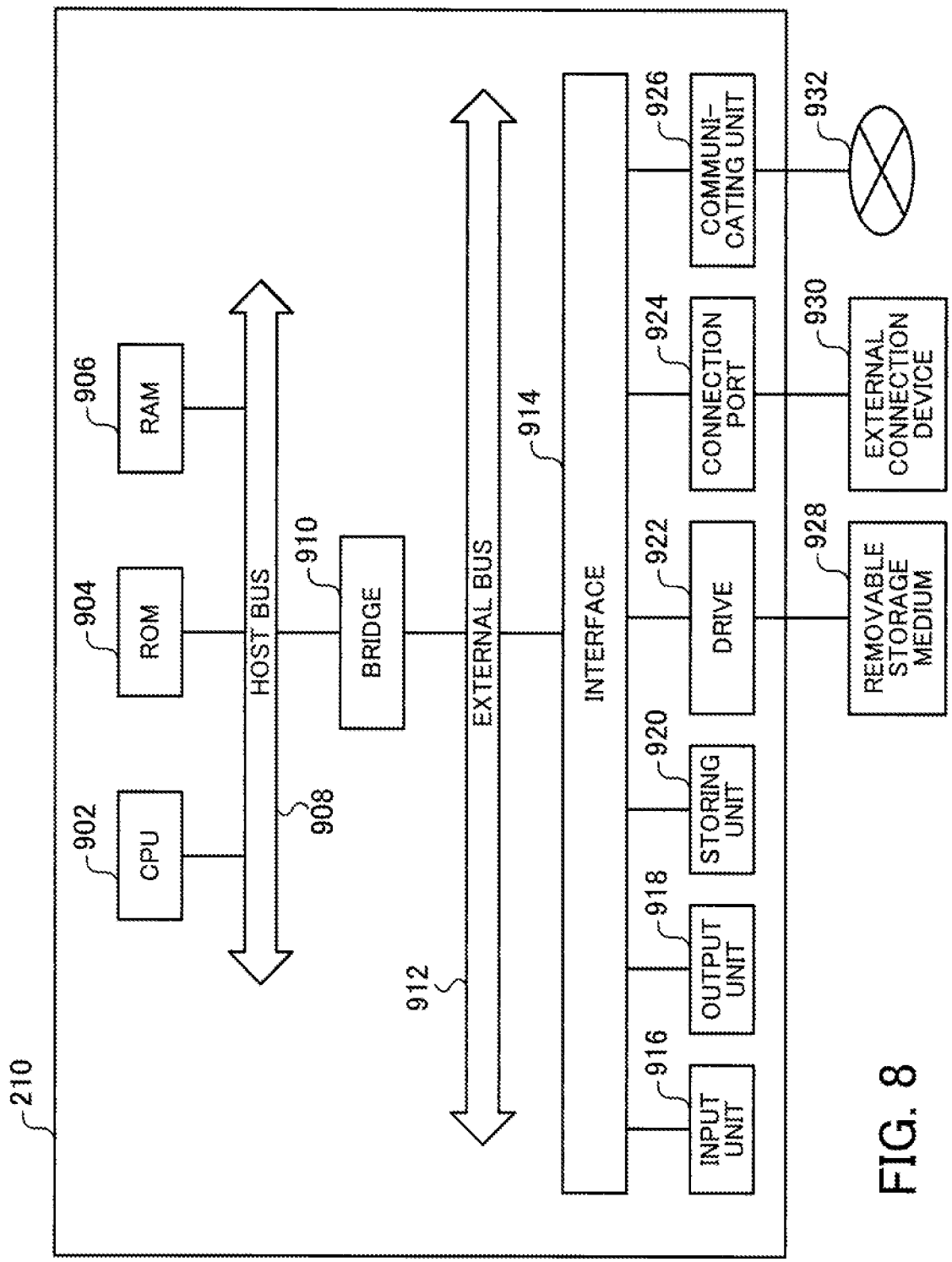
FIG. 8 illustrates an example of hardware capable of implementing functions of the node according to the second embodiment.

Next described is hardware capable of implementing functions of a node according to the second embodiment with reference to FIG. 8. FIG. 8 illustrates an example of hardware capable of implementing functions of a node according to the second embodiment. For example, the functions of the initial node 210 are implemented using hardware resources illustrated in FIG. 8. That is, the functions of the initial node 210 are implemented by controlling the hardware of FIG. 8 using a computer program.

The hardware mainly includes a CPU 902, read only memory (ROM) 904, RAM 906, a host bus 908, and a bridge 910, as illustrated in FIG. 8. Further, the hardware includes an external bus 912, an interface 914, an input unit 916, an output unit 918, a storing unit 920, a drive 922, a connection port 924, and a communicating unit 926. The CPU 902 functions, for example, as an arithmetic processing unit or a control device, and exercises control over all, or a part of, operations of the individual structural elements based on various programs recorded on the ROM 904, the RAM 906, the storing unit 920, or a removable storage medium 928. The ROM 904 is an example of memory units for storing, for example, programs to be loaded into the CPU 902 and data or the like to be used for calculation. The RAM 906 temporarily or permanently stores therein, for example, programs to be loaded into the CPU 902 as well as various parameters to change in the execution of the programs. These structural elements are connected to each other, for example, via the host bus 908 capable of high-speed data transmission. On the other hand, the host bus 908 is connected, for example, through the bridge 910 to the external bus 912 with a relatively low data transmission speed.

The input unit 916 is, for example, a mouse, a keyboard, a touch panel, a touch-pad, buttons, switches, levers or the like. Further, the input unit 916 may be a remote controller capable of transmitting a control signal using infrared or other radio waves. In addition, the input unit 916 may be other than such a device through which the user inputs information, and, for example, a device for collecting information sensed by a GPS, a temperature sensor, or an acceleration sensor and inputting the collected information into the CPU 902. The output unit 918 is, for example, a display device such as a cathode ray tube (CRT), a liquid crystal display (LCD), a plasma display panel (PDP), or an electro-luminescence display (ELD). Further, an audio output device, such as a speaker or headphones, or a printer may be employed as the output unit 918. That is, the output unit 918 is a device capable of outputting information visually or audibly.

The storing unit 920 is a device for storing therein various types of data. The storing unit 920 is, for example, a magnetic storage device such as a HDD, or alternatively may be a semiconductor storage device such as a SSD and a RAM disk, an optical storage device, or a magneto-optical storage device. The drive 922 is a device for reading information recorded on the removable storage medium 928 and writing information to the removable storage medium 928. The removable storage medium 928 is, for example, a magnetic disk, an optical disk, a magneto-optical disk, or semiconductor memory.

The connection port 924 is a port for connecting an external connection device 930, and is, for example, a universal serial bus (USB) port, an Institute of Electrical and Electronics Engineers (IEEE)-1394 port, a small computer system interface (SCSI), an RS-232C port, or an optical audio terminal. The external connection device 930 is, for example, a printer. The communicating unit 926 is a communication device used to connect with a network 932. The communicating unit 926 is, for example, a wired or wireless LAN communication circuit, a wireless USB (WUSB) communication circuit, an optical communication circuit or router, an Asymmetric Digital Subscriber Line (ADSL) communication circuit or router, or a mobile network communication circuit. The network 932 connected to the communicating unit 926 is a network connected with a wire or wirelessly, and is, for example, the Internet, a LAN, a broadcasting network, or a satellite communication link.

Note that the functions of each node other than the initial node 210 may also be implemented using the hardware illustrated in FIG. 8. That is, the functions of each of the gateway devices 200-1, 200-2, . . . , 200-N may be implemented using the hardware illustrated in FIG. 8. In addition, the functions of each of the control device 100 and the terminals 301, 302, and 303 may be implemented using the hardware illustrated in FIG. 8. Further, the hardware of FIG. 8 with some components removed therefrom or added thereto may be accepted as modifications. The hardware according to the second embodiment has been described thus far.

b-4. Functions

Next described are functions of individual nodes.

[Initial Nodes]

Figure 9:
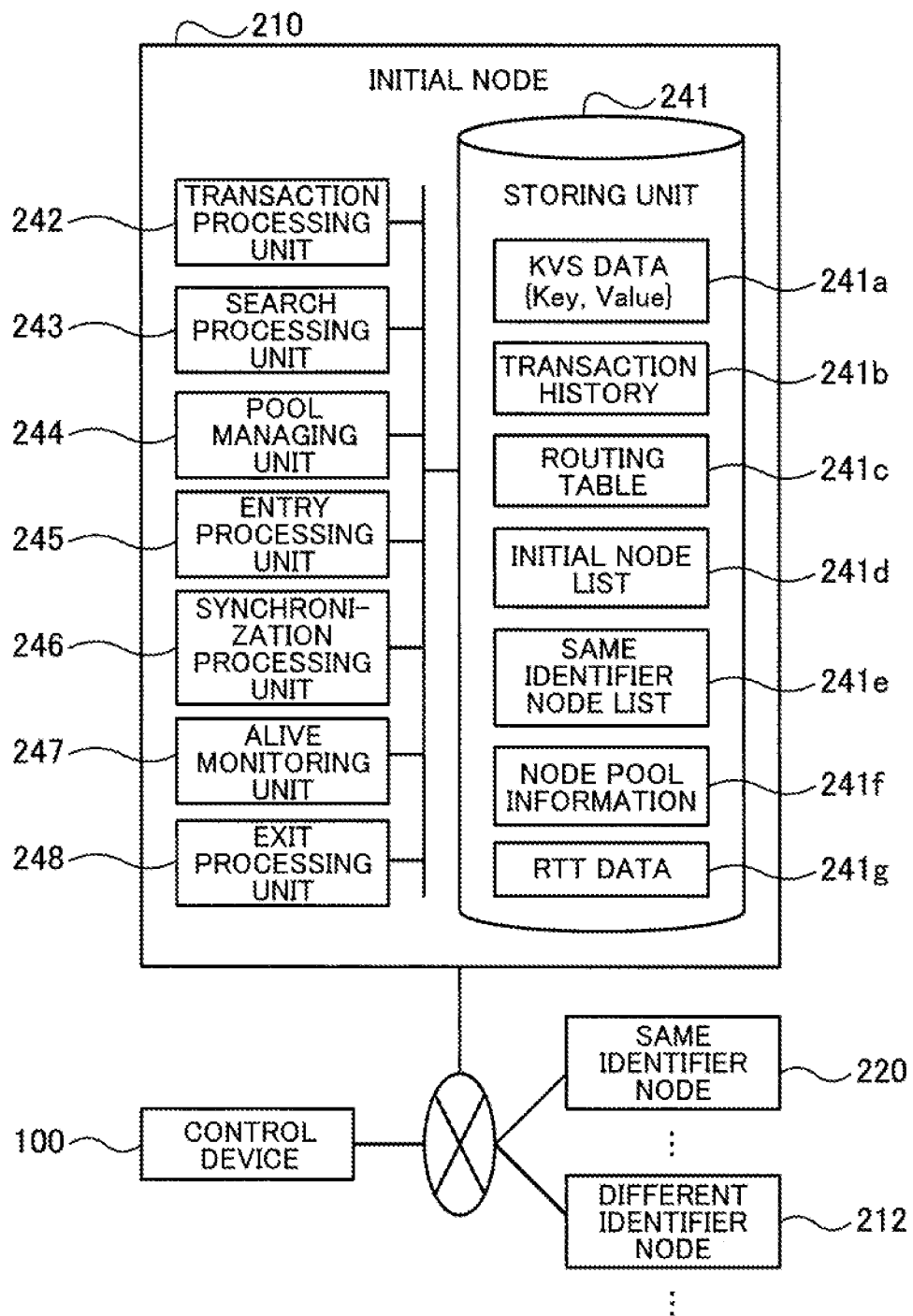
FIG. 9 is a block diagram illustrating an example of functions of an initial node according to the second embodiment.

First, functions of an initial node are described with reference to FIG. 9. FIG. 9 is a block diagram illustrating an example of functions of an initial node according to the second embodiment. Note that the functions of the initial node 210 are described as an example for the purpose of illustration. As illustrated in FIG. 9, the initial node 210 includes a storing unit 241, a transaction processing unit 242, a search processing unit 243, a pool managing unit 244, an entry processing unit 245, a synchronization processing unit 246, an alive monitoring unit 247, and an exit processing unit 248. Note that functions of the storing unit 241 may be implemented using, for example, the RAM 906 or the storing unit 920 described above. Functions of the transaction processing unit 242, the search processing unit 243, the pool managing unit 244, the entry processing unit 245, the synchronization processing unit 246, the alive monitoring unit 247, and the exit processing unit 248 may be implemented using, for example, the CPU 902 described above.

The storing unit 241 stores therein KVS data 241a, a transaction history 241b, a routing table 241c, an initial node list 241d, a same identifier node list 241e, node pool information 241f, and Round-Trip Time (RTT) data 241g. The KVS data 241a is key-value pairs, in each of which a key assigned to the initial node 210 (each of Key #5, Key #6, Key #7, and Key #0 in the example of FIG. 6) and a value are associated with each other.

The transaction history 241b is a history of transactions executed by the initial node 210 or nodes assigned to the same identifier as that to which the initial node 210 is assigned, as illustrated in FIG. 10. FIG. 10 illustrates an example of the transaction history according to the second embodiment. The transaction history 241b includes records already synchronized with other nodes assigned to the same identifier as well as records yet to be synchronized (hereinafter simply referred to as "not-yet-synchronized records"). To each of the synchronized records, version information (Ver.) is attached.

The transaction history 241b of FIG. 10 includes a transaction record of storing Key #5 in association with val05 ("put Key #5 val05") and a transaction record of storing Key #6 in association with val06 ("put Key #6 val06"). The transaction history 241b also includes a transaction record of deleting val05 associated with Key #5 ("del Key #5 val05") and a transaction record of storing Key #7 in association with val07 ("put Key #7 val07"). In the transaction history 241b, each transaction record is accompanied by information on an identifier space to which a node having executed the transaction belongs. For example, in the case where the initial node 210 has executed the transaction of storing Key #5 in association with val05, information on the identifier space 401 to which the initial node 210 belongs is added to the transaction history 241b, in association with the corresponding transaction record. Similarly, records of transactions each executed by a node assigned to the same identifier as that to which the initial node 210 is assigned are accumulated in the transaction history 241b of the storing unit 241, and each of the accumulated transaction records is accompanied by information on an identifier space to which a node having executed the transaction belongs.

When the completion of synchronization of not-yet-synchronized records has been confirmed among nodes assigned to the same identifier, the status of the not-yet-synchronized records is changed to "synchronized". At the timing of changing the status, the version information is added to the records. That is, each time the completion of synchronization is confirmed for a set of transactions, new version information is added to records corresponding to the transactions.

The routing table 241c is used to locate a node responsible for a given key. For example, the routing table 241c used by the initial node 210 is represented in FIG. 11. FIG. 11 illustrates an example of the routing table according to the second embodiment. As illustrated in FIG. 11, the routing table 241c includes, for example, columns of the following items: row number k; start; interval; and successor. The successor column includes, for each entry, information of a successor (e.g. IP address) belonging to the same identifier space 401 as the initial node 210 as well as information of nodes (e.g. IP addresses) in the identifier spaces 402 and 403, assigned to the same identifier as that to which the successor in the identifier space 401 is assigned.

The initial node list 241d contains information of all initial nodes (e.g. IP addresses) designated by the control device 100, as illustrated in FIG. 12. FIG. 12 illustrates an example of the initial node list according to the second embodiment. The initial nodes 210 and 212 are designated in the example of FIG. 6 and, therefore, information of the initial nodes 210 and 212 is set forth in the initial node list 241d of FIG. 12.

The same identifier node list 241e contains information of nodes (e.g. IP addresses) assigned to the same identifier as that to which the initial node 210 is assigned, as illustrated in FIG. 13. FIG. 13 illustrates an example of the same identifier node list according to the second embodiment. The normal nodes 220 and 230 are assigned to ID #0 to which the initial node 210 is also assigned in the example of FIG. 6 and, therefore, information of the normal nodes 220 and 230 is set forth in the same identifier node list 241e of FIG. 13.

The node pool information 241f includes, as illustrated in FIG. 14, information of nodes (e.g. IP addresses) housed in the node pool 410. FIG. 14 illustrates an example of the node pool information according to the second embodiment. For example, in the case where normal nodes 216 and so on are housed in the node pool 410, information of the normal nodes 216 and so on is set forth in the node pool information 241f.

Figure 15:
FIG. 15 illustrates an example of RTT data according to the second embodiment.

The RTT data 241g is, as illustrated in FIG. 15, data indicating the round-trip time (RTT) measured for each node pair formed of nodes housed in the node pool 410. FIG. 15 illustrates an example of RTT data according to the second embodiment. The RTT is the length of time it takes for a message to be sent from a node of each pair to the other node plus the length of time it takes for an acknowledgement of the message to be received. The reference to each RTT allows evaluating the distance between the two nodes on a communication path therebetween.

For example, by extracting pairs of nodes on short RTT paths (which is often termed "clustering") with reference to the RTT data 241g, a set of nodes having short communication paths (a neighboring node group) is obtained. In a multiple distributed KVS system, transfer of transaction requests and synchronization of transaction records are made across nodes assigned to the same identifier, and the system performance is therefore enhanced more by assigning nodes with shorter inter-node distances to the same identifier. For this reason, in the multiple distributed KVS system of the second embodiment, nodes belonging to a neighboring node group are assigned to the same identifier. To do this, the RTT data 241g is used.

Now let us refer back to FIG. 9. The transaction processing unit 242 processes a request for a transaction received from a user of the multiple distributed KVS system or a different node. For example, the user requests the initial node 210 via the control device 100 for a transaction. If the transaction is related to a key assigned to the initial node 210, the transaction processing unit 242 reflects the transaction according to the request in the KVS data 241a. In addition, the transaction processing unit 242 adds the content of the transaction and information of its own identifier space 401 to the transaction history 241b. If the received transaction request is issued by another node, the transaction processing unit 242 reflects the transaction in the KVS data 241a and adds appropriate information to the transaction history 241b, as is the case described above.

The search processing unit 243 locates a node responsible for a designated key by referring to the routing table 241c. For example, when the transaction processing unit 242 receives a request for a transaction on a key which is not assigned to the initial node 210, the search processing unit 243 identifies the identifier of a successor corresponding to the key based on the routing table 241c. For example, when the transaction processing unit 242 receives a request for a transaction on Key #1 (KeyID=1), the search processing unit 243 refers to the routing table 241c (see FIG. 11) and identifies the interval ([1, 2)) including the KeyID. In addition, the search processing unit 243 identifies the identifier (ID=2) of the successor corresponding to the identified interval. Then, the search processing unit 243 notifies the transaction processing unit 242 of the identifier of the identified successor. Upon receiving the notification, the transaction processing unit 242 transfers the transaction request to the successor.

The pool managing unit 244 manages the node pool 410. For example, when a node is added to the node pool 410, the pool managing unit 244 collects information of the added node (e.g. IP address) and adds the collected information to the node pool information 241f. In addition, the pool managing unit 244 notifies the initial node 212 of the node addition and provides the initial node 212 with information of the added node. On the other hand, when the pool managing unit 244 is notified by the initial node 212 of node addition, the pool managing unit 244 adds node information provided by the initial node 212 to the node pool information 241f.

The pool managing unit 244 also measures the RTT between every pair of nodes housed in the node pool 410 and adds the measured RTT to the RTT data 241g. In addition, the pool managing unit 244 extracts a neighboring node group based on the RTT's set forth in the RTT data 241g. Note that the RTT measurement is made at predetermined intervals or timing. The neighboring node group extraction may be performed at predetermined intervals or timing, or may be performed when the entry processing unit 245 executes node entry processing.

The entry processing unit 245 performs a process associated with a node entry. For example, upon receiving an entry request from a node not assigned to an identifier, the entry processing unit 245 houses the node in the node pool 410. In addition, if determining, with reference to the node pool information 241f, that the number of nodes housed in the node pool 410 is equal to or more than the number of identifier spaces, the entry processing unit 245 selects nodes as many as the number of identifier spaces and allocates the same identifier to each of the selected nodes. Subsequently, the entry processing unit 245 assigns each of the ID-allocated nodes to the corresponding identifier in one of the identifier spaces 401, 402, and 403.

Note that the entry processing unit 245 may be configured to perform the selection of nodes, the allocation of an identifier, and the node assignment to the identifier if there is a neighboring node group including nodes as many as the number of identifier spaces. In this case, node entries are held off even if nodes as many as or more than the number of identifier spaces are housed in the node pool 410. This scheme contributes to improving the system performance because a set of nodes having short communication paths is assigned to the same identifier.

The synchronization processing unit 246 synchronizes the transaction history 241b with other nodes assigned to the same identifier. For example, the synchronization processing unit 246 determines, among transaction records in the transaction history 241b, those yet to be passed to other nodes assigned to the same identifier and then notifies each of the nodes in the same identifier node list 241e of the determined transaction records. Note that the synchronization processing may be performed at predetermined intervals or timing, or each time the transaction processing unit 242 performs a requested transaction.

In addition, as for a set of transactions in the transaction history 241b, for which the completion of synchronization has yet to be confirmed (not-yet-synchronized records), the synchronization processing unit 246 implements confirmation of the completion of synchronization with other nodes assigned to the same identifier. Note that the confirmation of the completion of synchronization may be sought at predetermined intervals or timing, when the synchronization processing mentioned above is completed, or when a predetermined amount of time has elapsed after the completion of the synchronization processing.

The confirmation of the completion of synchronization is performed, for example, using a checksum calculated based on the not-yet-synchronized records. The checksum is calculated using a function taking a set of transactions as an input and returning the same value for the same combination of transactions included in the set. That is, if the set contains the same not-yet-synchronized transaction records, the same checksum is returned even if they are input in a different order.

In implementing confirmation of the completion of synchronization, the synchronization processing unit 246 calculates a checksum for the not-yet-synchronized records included in the transaction history 241b, and requests each of other nodes assigned to the same identifier (i.e., the normal nodes 220 and 230) for a checksum. Then, if the checksums obtained from the other nodes match the calculated checksum, the synchronization processing unit 246 changes, within the transaction history 241b, the status of the not-yet-synchronized records used for the checksum calculation to "synchronized", and adds new version information to the records with the status changed to "synchronized". Thus, the use of the version information facilitates easy tracking of up to which transactions they have been synchronized and which transactions are yet to be synchronized.

The alive monitoring unit 247 monitors an acknowledgement of a transaction notification when the synchronization processing unit 246 performs synchronization processing, and determines whether a node to which the transaction notification has been sent is in a state capable of communicating according to the presence or absence of the acknowledgement. For example, the alive monitoring unit 247 measures the delay time from the transmission of the notification to the reception of the acknowledgement. If the delay time exceeds a predetermined threshold, the alive monitoring unit 247 determines that the destination node is in a state incapable of establishing communication (that is, the destination node has been off from the system).

In addition, the alive monitoring unit 247 counts the number of nodes determined to have exited the system. Then, if the counted number is equal to or more than a predetermined threshold (for example, 2), the alive monitoring unit 247 notifies the exit processing unit 248 of the number of nodes having exited being equal to or more than the threshold. Note that the alive monitoring unit 247 may count the number of remaining nodes other than the initial node 210 and then compare the counted number with a predetermined threshold (for example, 1). Then, the alive monitoring unit 247 deletes information of the nodes determined to have exited from the same identifier node list 241e and the routing table 241c.

The exit processing unit 248 performs a process of pulling out of the system the initial node 210 as well as other nodes assigned to the same identifier as that to which the initial node 210 is assigned. For example, upon receiving, from the alive monitoring unit 247, a notification indicating that the number of nodes having exited is equal to or more than the threshold, the exit processing unit 248 selects, amongst nodes assigned to identifiers different from that to which the initial node 210 is assigned, an alternative node to which the KVS data 241a is going to be transferred. Then, the exit processing unit 248 transfers the KVS data 241a to the alternative node and notifies each node not targeted for the exit processing of the exit of the initial node 210.

In addition, the exit processing unit 248 issues an entry request to the initial node 212. By issuing the entry request to the initial node 212, the initial node 210 is housed in the node pool 412. Note that if there is a different node subject to the exit processing, the exit processing unit 248 may instruct the different node to determine an alternative node, transfer KVS data, send a notification of its exit, and issue an entry request.

Further, the exit processing unit 248 requests the control device 100 to designate an initial node in place of the initial node 210. Note that if there is no initial node other than the initial node 210, the exit processing unit 248 requests the control device 100 to designate an initial node before notifying each node not targeted for the exit processing of the exit of the initial node 210. Then, after a new initial node is established and each node is notified of the new initial node, the exit processing unit 248 sends the notification of the exit of the initial node 210 and issues an entry request to the new initial node. The functions of the initial node 210 have been described thus far. Note that the initial node 212 has the same functions as those of the initial node 210.

[Normal Nodes]

Figure 16:
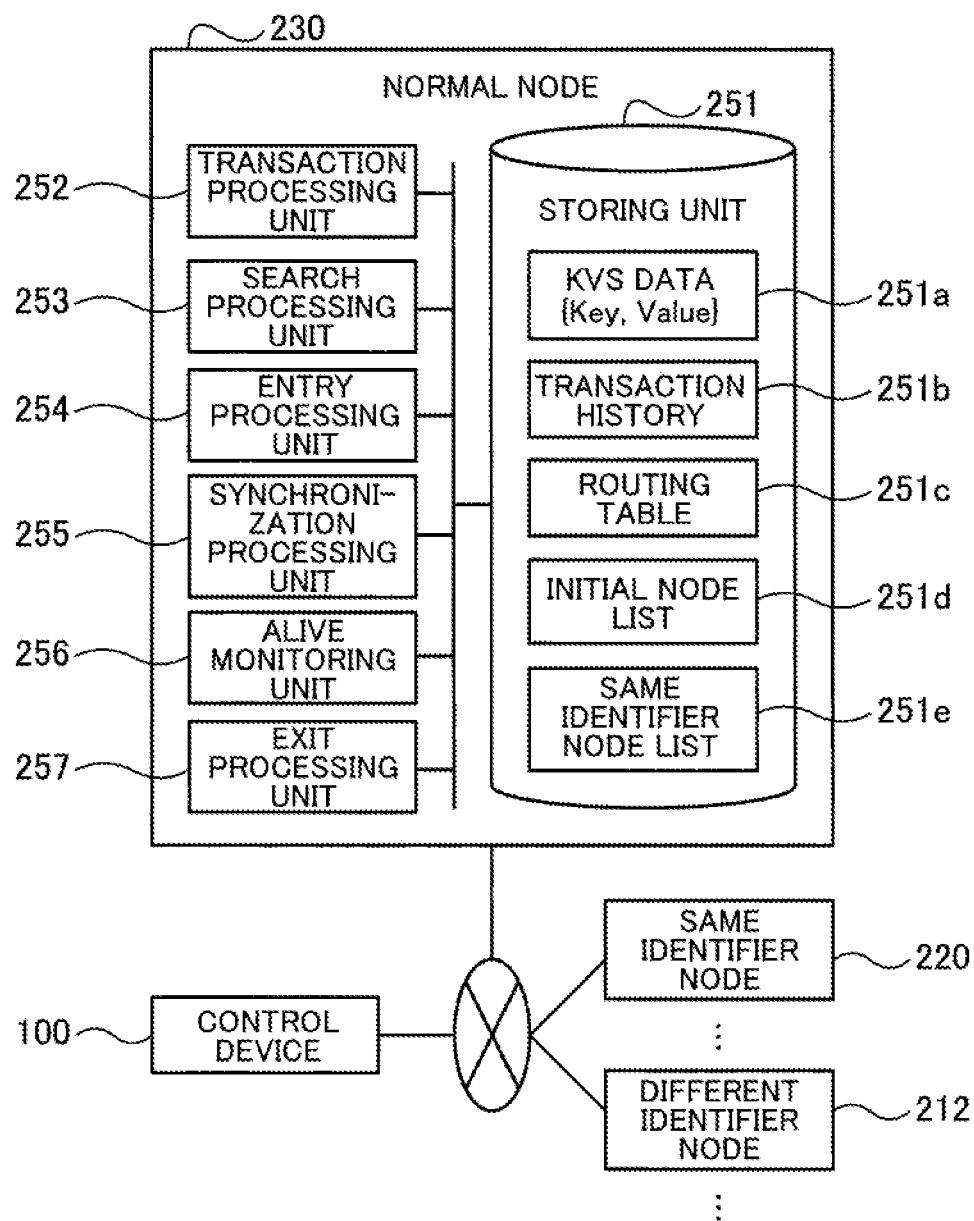
FIG. 16 is a block diagram illustrating an example of functions of a normal node according to the second embodiment.

Next, functions of a normal node are described with reference to FIG. 16. FIG. 16 is a block diagram illustrating an example of functions of a normal node according to the second embodiment. Note that the functions of the normal node 230 are described as an example for the purpose of illustration. As illustrated in FIG. 16, the normal node 230 includes a storing unit 251, a transaction processing unit 252, a search processing unit 253, an entry processing unit 254, a synchronization processing unit 255, an alive monitoring unit 256, and an exit processing unit 257. Note that functions of the storing unit 251 may be implemented using, for example, the RAM 906 or the storing unit 920 described above. Functions of the transaction processing unit 252, the search processing unit 253, the entry processing unit 254, the synchronization processing unit 255, the alive monitoring unit 256, and the exit processing unit 257 may be implemented using, for example, the CPU 902 described above.

The storing unit 251 stores therein KVS data 251a, a transaction history 251b, a routing table 251c, an initial node list 251d, and a same identifier node list 251e. The KVS data 251a is key-value pairs, in each of which a key assigned to the normal node 230 (each of Key #5, Key #6, Key #7, and Key #0 in the example of FIG. 6) and a value are associated with each other. The transaction history 251b is a history of transactions executed by the normal node 230 or nodes assigned to the same identifier as that to which the normal node 230 is assigned, as in the case of the transaction history 241b above (see FIG. 10). The routing table 251c is used to locate a node responsible for a given key, as in the case of the routing table 241c above (see FIG. 11).

The initial node list 251d contains information of all initial nodes (e.g. IP addresses) designated by the control device 100, as in the case of the initial node list 241d above (see FIG. 12). The same identifier node list 251e contains information of nodes (e.g. IP addresses) assigned to the same identifier as that to which the normal node 230 is assigned, as in the case of the same identifier node list 241e (see FIG. 13).

Note that because the normal node 230 and the initial node 210 are assigned to the same identifier, the content of the routing table 251c and the same identifier node list 251e is almost the same as that of the routing table 241c and the same identifier node list 241e, respectively. In addition, each node has the same content of the initial node list 251d.

The transaction processing unit 252 processes a request for a transaction received from a user of the multiple distributed KVS system or a different node. For example, the user requests the normal node 230 via the control device 100 for a transaction. If the transaction is related to a key assigned to normal node 230, the transaction processing unit 252 reflects the transaction according to the request in the KVS data 251a. In addition, the transaction processing unit 252 adds the content of the transaction and information of its own identifier space 403 to the transaction history 251b. If the received transaction request is issued by another node, the transaction processing unit 252 reflects the transaction in the KVS data 251a and adds appropriate information to the transaction history 251b, as is the case described above.

The search processing unit 253 locates a node responsible for a designated key by referring to the routing table 251c. For example, when the transaction processing unit 252 receives a request for a transaction on a key which is not assigned to the normal node 230, the search processing unit 253 identifies the identifier of a successor corresponding to the key based on the routing table 251c. Then, the search processing unit 253 notifies the transaction processing unit 252 of the identifier of the identified successor. Upon receiving the notification, the transaction processing unit 252 transfers the transaction request to the successor.

The entry processing unit 254 issues an entry request to an initial node set forth in the initial node list 251d. When an identifier is allocated by the initial node and the normal node 230 is assigned to the identifier, the entry processing unit 254 acquires information on node assignment from the initial node and generates the routing table 251c. In the case where the initial node generates the routing table 251c, the entry processing unit 254 acquires the routing table 251c from the initial node.

The synchronization processing unit 255 synchronizes the transaction history 251b with other nodes assigned to the same identifier. For example, the synchronization processing unit 255 determines, among transaction records in the transaction history 251b, those yet to be passed to other nodes assigned to the same identifier and then notifies each of the nodes in the same identifier node list 251e of the determined transaction records.

Note that the synchronization processing may be performed at predetermined intervals or timing, or each time the transaction processing unit 252 performs a requested transaction. In addition, the synchronization processing unit 255 may request each of the nodes assigned to the same identifier for synchronization when the normal node 230 enters the system, then store transaction histories acquired from the nodes in the storing unit 251 as the transaction history 251b, and generate the KVS data 251a based on the transaction history 251b.

In addition, as for a set of transactions in the transaction history 251b, for which the completion of synchronization has yet to be confirmed (not-yet-synchronized records), the synchronization processing unit 255 implements confirmation of the completion of synchronization with other nodes assigned to the same identifier. Note that the confirmation of the completion of synchronization may be sought at predetermined intervals or timing, when the synchronization processing mentioned above is completed, or when a predetermined amount of time has elapsed after the completion of the synchronization processing.

The confirmation of the completion of synchronization is performed, for example, using a checksum calculated based on the not-yet-synchronized records. The checksum is calculated using a function taking a set of transactions as an input and returning the same value for the same combination of transactions included in the set. That is, if the set contains the same not-yet-synchronized transaction records, the same checksum is returned even if they are input in a different order.

In implementing confirmation of the completion of synchronization, the synchronization processing unit 255 calculates a checksum for the not-yet-synchronized records included in the transaction history 251b, and requests each of other nodes assigned to the same identifier (i.e., the initial node 210 and the normal node 220) for a checksum. Then, if the checksums obtained from the other nodes match the calculated checksum, the synchronization processing unit 255 changes, within the transaction history 251b, the status of the not-yet-synchronized records used for the checksum calculation to "synchronized", and adds new version information to the records with the status changed to "synchronized". Thus, the use of the version information facilitates easy tracking of up to which transactions they have been synchronized and which transactions are yet to be synchronized.

The alive monitoring unit 256 monitors an acknowledgement of a transaction notification when the synchronization processing unit 255 performs synchronization processing, and determines whether a node to which the transaction notification has been sent is in a state capable of communicating according to the presence or absence of the acknowledgement. For example, the alive monitoring unit 256 measures the delay time from the transmission of the notification to the reception of the acknowledgement. If the delay time exceeds a predetermined threshold, the alive monitoring unit 256 determines that the destination node is in a state incapable of establishing communication (that is, the destination node has been off from the system).

In addition, the alive monitoring unit 256 counts the number of nodes determined to have exited the system. Then, if the counted number is equal to or more than a predetermined threshold (for example, 2), the alive monitoring unit 256 notifies the exit processing unit 257 of the number of nodes having exited being equal to or more than the threshold. Note that the alive monitoring unit 256 may count the number of remaining nodes other than the normal node 230 and then compare the counted number with a predetermined threshold (for example, 1). Then, the alive monitoring unit 256 deletes information of the nodes determined to have exited from the same identifier node list 251e and the routing table 251c.

The exit processing unit 257 performs a process of pulling out of the system the normal node 230 as well as other nodes assigned to the same identifier as that to which the normal node 230 is assigned. For example, upon receiving, from the alive monitoring unit 256, a notification indicating that the number of nodes having exited is equal to or more than the threshold, the exit processing unit 257 selects, amongst nodes assigned to identifiers different from that to which the normal node 230 is assigned, an alternative node to which the KVS data 251a is going to be transferred. Then, the exit processing unit 257 transfers the KVS data 251a to the alternative node and notifies each node not targeted for the exit processing of the exit of the normal node 230.

In addition, the exit processing unit 257 issues an entry request to the initial node 212. By issuing the entry request to the initial node 212, the normal node 230 is housed in the node pool 412. Note that if there is a different node subject to the exit processing, the exit processing unit 257 may instruct the different node to determine an alternative node, transfer KVS data, send a notification of its exit, and issue an entry request. The functions of the normal node 230 have been described thus far. Note that other normal nodes than the normal node 230 (e.g. the normal node 214) individually have the same functions as those of the normal node 230.

b-5. Processing Sequences

Next described are processing sequences taking place in the multiple distributed KVS system.

[Node Entry]

Figure 17:
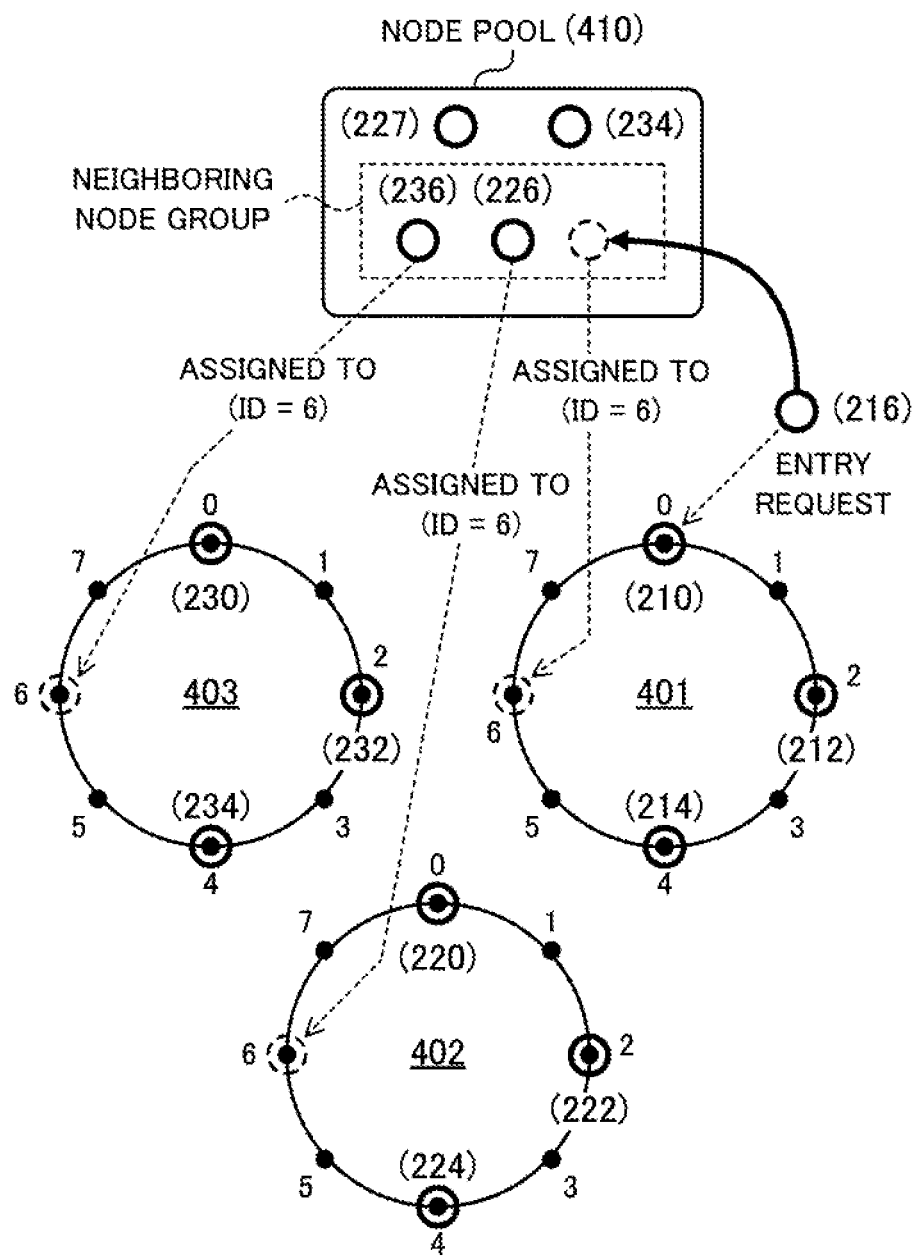
FIG. 17 illustrates a node assignment method according to the second embodiment.
Figure 18:
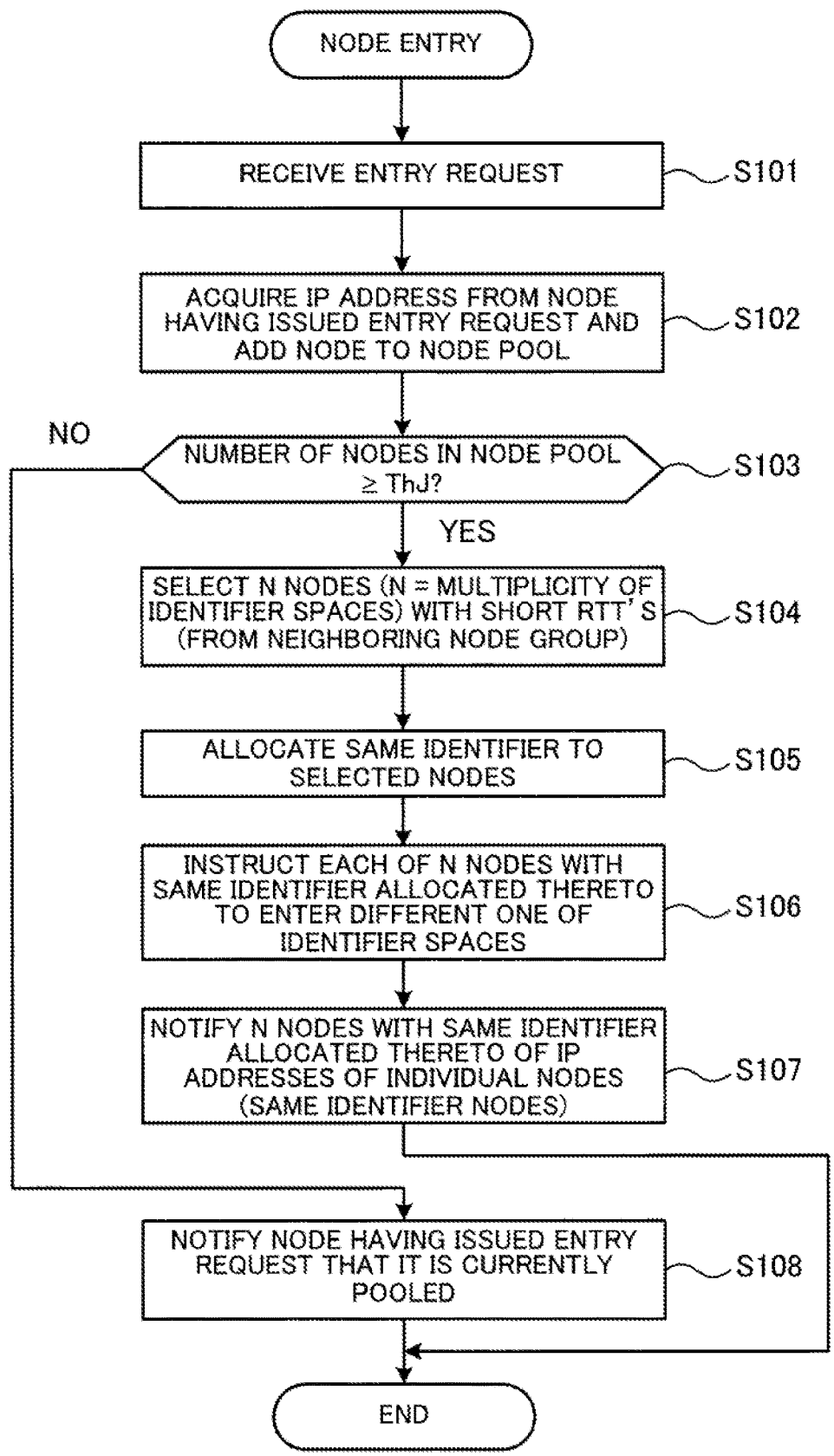
FIG. 18 is a flow diagram illustrating a processing sequence taking place at the time of a node entry according to the second embodiment.

First, a processing sequence taking place at the time of a node entry is described with reference to FIGS. 17 and 18. FIG. 17 illustrates a node assignment method according to the second embodiment. FIG. 18 is a flow diagram illustrating the processing sequence taking place at the time of the node entry according to the second embodiment. An example of FIG. 17 illustrates assignment processing performed in response to an entry request issued by a normal node 216 to the initial node 210. According to this example, normal nodes 226, 227, 234, and 236 are housed in the node pool 410, and the initial node 210 then houses the normal node 216 in the node pool 410 upon receiving the entry request from the normal node 216.

For example, when the normal nodes 216, 226, and 236 are extracted as a neighboring node group based on the RTT data 241g, the initial node 210 allocates the same identifier (ID #6 in this example) to the normal nodes 216, 226, and 236. Then, the initial node 210 assigns, for example, the normal node 216 to ID #6 in the identifier space 401; the normal node 226 to ID #6 in the identifier space 402; and the normal node 236 to ID #6 in the identifier space 403.

Because changes are made to the node assignment due to the entries of the normal nodes 216, 226, and 236, the routing table held in each node is updated. If Key #0, Key #1, . . . , Key #7 have been assigned to nodes as in the example of FIG. 6, changes are also made to the key assignment due to the entries of the normal nodes 216, 226, and 236. In this example, Key #5 and Key #6 having been assigned to the initial node 210 and the normal nodes 220 and 230 are assigned to the normal nodes 216, 226, and 236.

Upon receiving an entry request such as the one above, the initial node 210 performs processing in the following sequence (see FIG. 18).

[Step S101] The entry processing unit 245 receives the entry request from the normal node 216.

[Step S102] The entry processing unit 245 acquires node information (i.e., IP address) from the normal node 216 having issued the entry request. In addition, the entry processing unit 245 adds the normal node 216 to the node pool 410. That is, the entry processing unit 245 adds the information of the normal node 216 to the node pool information 241f.

[Step S103] The entry processing unit 245 refers to the node pool information 241f to determine whether the number of nodes housed in the node pool 410 is equal to or more than a threshold ThJ. The threshold ThJ takes, for example, a value greater than the number of identifier spaces (multiplicity). If the number of nodes is equal to or more than the threshold ThJ, the entry processing unit 245 moves to step S104. On the other hand, if the number of nodes is below the threshold ThJ, the entry processing unit 245 moves to step S108.

[Step S104] The entry processing unit 245 refers to the RTT data 241g and selects N nodes (N represents the multiplicity of identifier spaces) with short RTT's. Note that if neighboring node groups have been extracted, the entry processing unit 245 makes the node selection amongst a neighboring node group including N nodes therein. For example, the entry processing unit 245 makes the node selection in such a manner as to yield the minimum sum of RTT's measured for every possible pair of nodes selected from the N nodes.

[Step S105] The entry processing unit 245 allocates the same identifier to the nodes selected in step S104. In this regard, the entry processing unit 245 specifies one identifier from identifiers to which no nodes are assigned in the identifier spaces 401, 402, and 403, and allocates the specified identifier to the nodes selected in step S104. If there are a plurality of identifiers yet to be allocated, the entry processing unit 245 selects, for example, one identifier randomly from them.

[Step S106] The entry processing unit 245 instructs each of the N nodes with the same identifier allocated thereto to enter a different one of the identifier spaces 401, 402, and 403. That is, the entry processing unit 245 assigns one node to the same identifier of each of the identifier spaces 401, 402, and 403.

[Step S107] The entry processing unit 245 notifies the N nodes with the same identifier allocated thereto of information of the individual nodes (IP addresses). That is, the entry processing unit 245 collects the information from each of the N nodes and notifies them of the collected information so that they are individually able to generate the same identifier node list. After the completion of step S107, a sequence of processing illustrated in FIG. 18 ends.

[Step S108] The entry processing unit 245 notifies the normal node 216 having issued the entry request that the normal node 216 is currently pooled. The term "being pooled" refers to the state of being housed in the node pool 410 and waiting for assignment to an identifier. After receiving the notification, the normal node 216 waits for an identifier to be assigned thereto by the initial node 210. After the completion of step S108, a sequence of processing illustrated in FIG. 18 ends. The processing sequence taking place at the time of a node entry has been described thus far.

[KVS Transactions]

Figure 19:
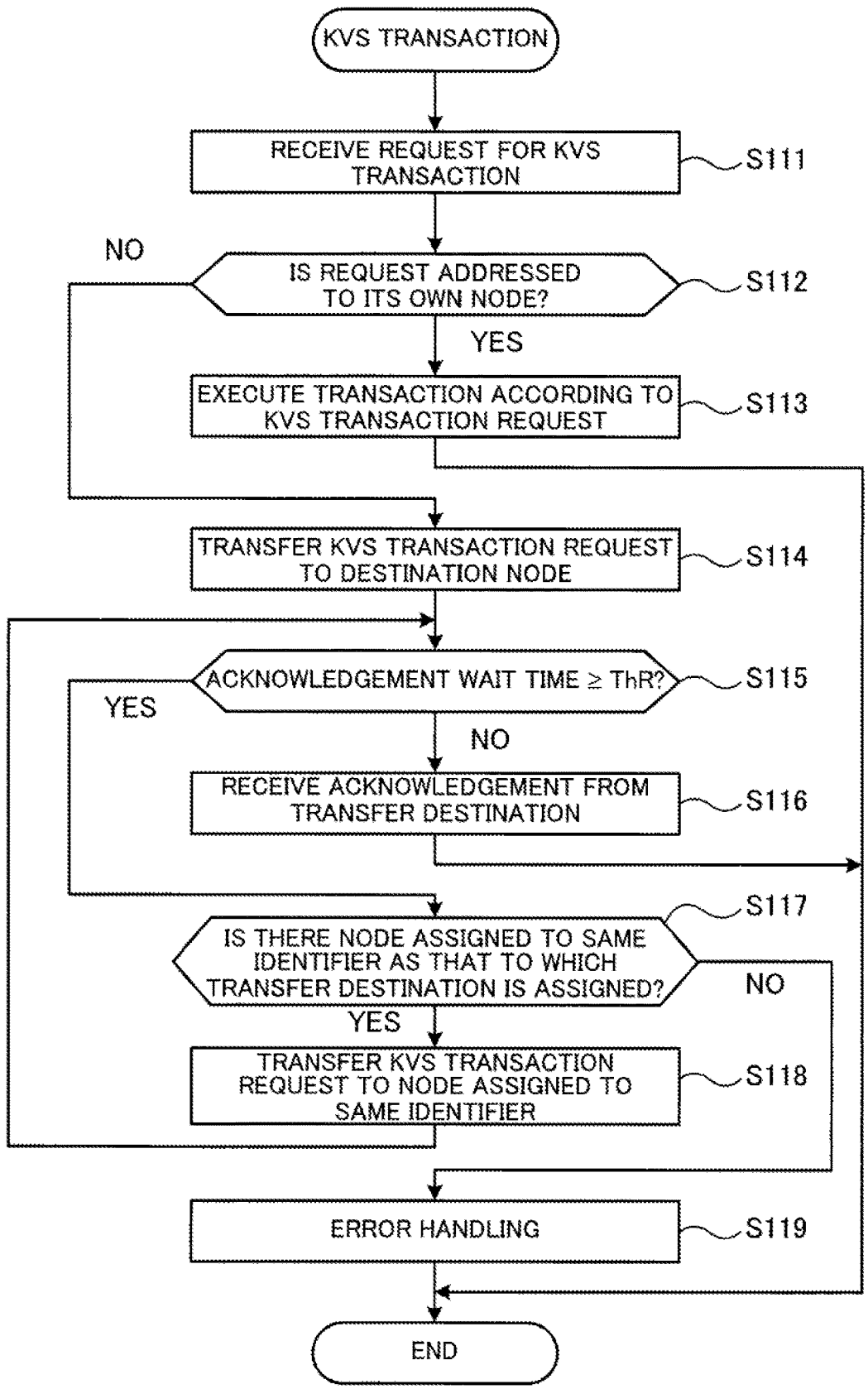
FIG. 19 is a flow diagram illustrating a processing sequence taking place in association with receiving a KVS transaction request according to the second embodiment.

Next described is a processing sequence taking place at the time of receiving a KVS transaction (a transaction on KVS data) request, with reference to FIG. 19. FIG. 19 is a flow diagram illustrating the processing sequence taking place in association with receiving a KVS transaction request according to the second embodiment. In the following example, let us assume that the initial node 210 receives a transaction request for the purpose of illustration.

[Step S111] The transaction processing unit 242 receives a request for a KVS transaction (a transaction on KVS data). The KVS transaction request includes information of a key associated with a value targeted for the transaction. KVS transactions include, for example, storing a value (put), acquiring a value (get), and deleting a value (del).

[Step S112] The transaction processing unit 242 determines whether the received KVS transaction request is addressed to its own node (i.e., the initial node 210). For example, if a set of keys assigned to the initial node 210 includes the key designated by the KVS transaction request, the transaction processing unit 242 determines that the request is addressed to its own node. If having determined that the request is addressed to its own node, the transaction processing unit 242 moves to step S113. On the other hand, if having determined that the request is not addressed to its own node, the transaction processing unit 242 moves to step S114.

[Step S113] The transaction processing unit 242 executes a transaction according to the KVS transaction request. For example, if the request asks to store a value (put), the transaction processing unit 242 stores a pair of the key and its value in the storing unit 241 as the KVS data 241a according to the request. If the request asks to acquire a value (get), the transaction processing unit 242 acquires a value associated with the designated key from the storing unit 241 and returns the acquired value to a requestor of the KVS transaction. If the request asks to delete a value (del), the transaction processing unit 242 deletes the designated key and its value from the storing unit 241. In addition, the transaction processing unit 242 records, in the transaction history 241b, the content of the executed KVS transaction and information of the identifier space 401 to which the initial node 210 belongs. After the completion of step S113, a sequence of processing illustrated in FIG. 19 ends.

[Step S114] The transaction processing unit 242 transfers the KVS transaction request to a destination node (a node responsible for the designated key). For example, the transaction processing unit 242 notifies the search processing unit 243 of information of the key included in the request and requests for IP addresses of nodes responsible for the key. Upon receiving the request, the search processing unit 243 refers to the routing table 241c to identify nodes responsible for the notified key (successors). Then, the search processing unit 243 notifies the transaction processing unit 242 of the IP addresses of the identified nodes.

The transaction processing unit 242 acquires, from the search processing unit 243, the IP addresses of the nodes assigned to the same identifier as IP addresses of search target nodes. The transaction processing unit 242 selects, amongst the acquired IP addresses, the IP address of a node belonging to the same identifier space 401 as the initial node 210 and then transfers the KVS transaction request to the selected IP address.

[Step S115] The transaction processing unit 242 measures the time after transferring the KVS transaction request until it receives an acknowledgement from the destination node (acknowledgement wait time). Subsequently, the transaction processing unit 242 determines whether the acknowledgement wait time is equal to or more than a threshold ThR. The threshold ThR may be set discretionally; however, for example, it is set based on a predicted value obtained by adding a margin to the RTT between the initial node 210 and the destination node. If the acknowledgement wait time is equal to or more than the threshold ThR, the transaction processing unit 242 moves to step S117. On the other hand, if the acknowledgement wait time is below the threshold ThR, the transaction processing unit 242 moves to step S116.

[Step S116] The transaction processing unit 242 receives an acknowledgement from the transfer destination (destination node) of the KVS transaction. In the case where the KVS transaction is to store a value (put) or delete a value (del), the received acknowledgment indicates the completion of the transaction at the destination node. In the case where the KVS transaction is to acquire a value (get), the transaction processing unit 242 receives a value associated with the designated key as the acknowledgement from the destination node. In this case, the transaction processing unit 242 returns the received value to the requestor of the KVS transaction. After the completion of step S116, a sequence of processing illustrated in FIG. 19 ends.

[Step S117] The transaction processing unit 242 determines whether there is a node assigned to the same identifier (destination node) as that to which the transfer destination of step S114 is assigned. For example, the transaction processing unit 242 identifies, amongst the IP addresses acquired from the search processing unit 243, IP addresses of nodes belonging to the identifier spaces 402 and 403 other than that of the initial node 210. Then, the transaction processing unit 242 transmits, to each of the identified IP addresses, a message to check the operational state of the corresponding node.

If at least one acknowledgement is obtained for the transmitted message, the transaction processing unit 242 determines that there is a destination node. If determining that there is a destination node, the transaction processing unit 242 moves to step S118. Note that in the case of having received acknowledgments from a plurality of nodes, the transaction processing unit 242 selects one from unselected nodes as a destination node. On the other hand, in the case of having determined that there is no destination node, the transaction processing unit 242 moves to step S119.

[Step S118] The transaction processing unit 242 transfers the KVS transaction request to the destination node (the node assigned to the same identifier). After the completion of step S118, the transaction processing unit 242 moves to step S115.

[Step S119] The transaction processing unit 242 performs a process to handle errors (error handling) when the KVS transaction has been terminated with an error. For example, the transaction processing unit 242 notifies the requestor of the KVS transaction of the KVS transaction having been terminated with an error. After the completion of step S119, a sequence of processing illustrated in FIG. 19 ends. The processing sequence taking place at the time of receiving a KVS transaction (a transaction on KVS data) request has been described thus far.

[Synchronization of Transaction Records and Node Alive Monitoring]

Figure 20:
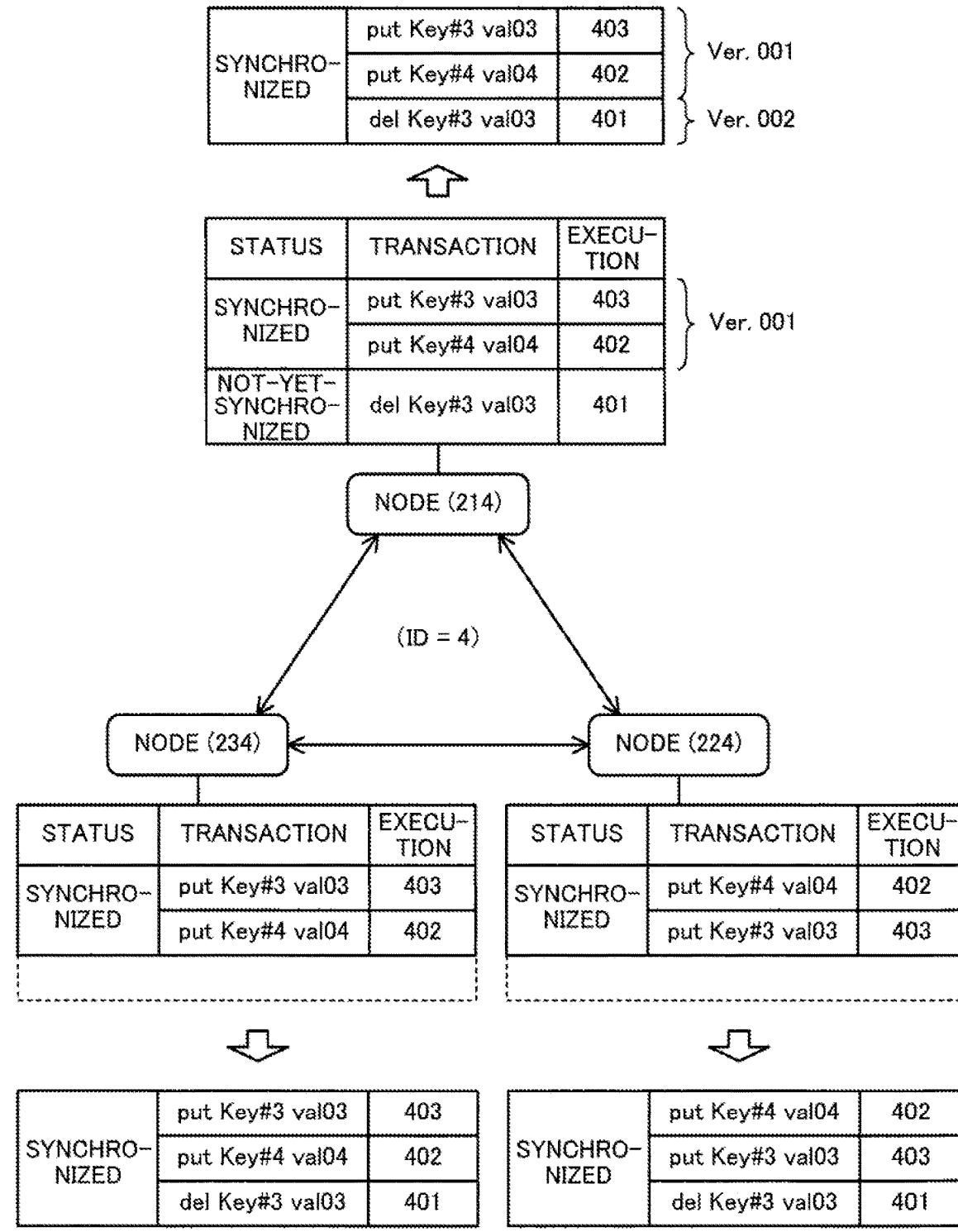
FIG. 20 illustrates synchronization and alive monitoring processing according to the second embodiment.
Figure 21:
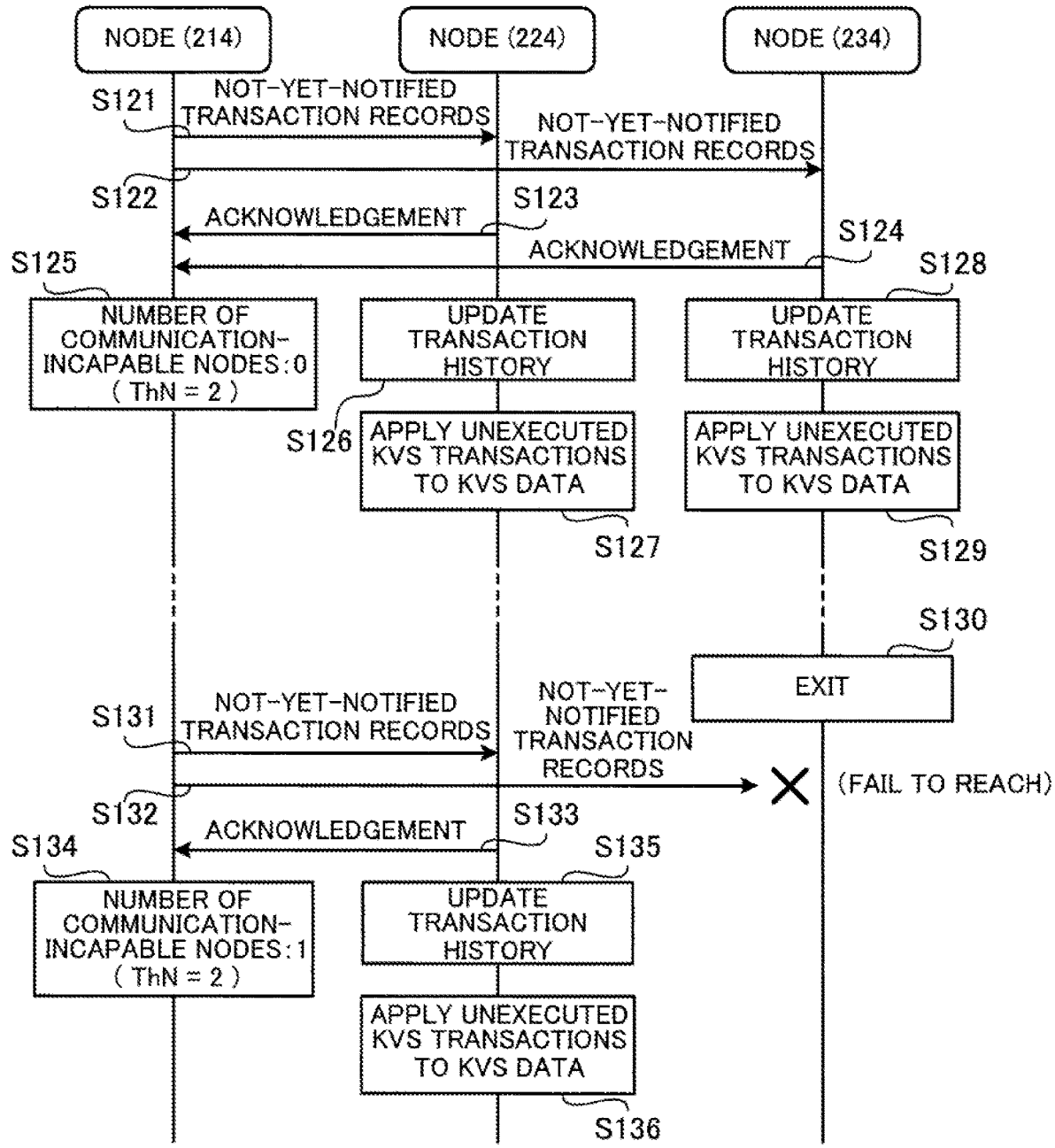
FIG. 21 is a first sequence diagram illustrating the synchronization and alive monitoring processing according to the second embodiment.
Figure 22:
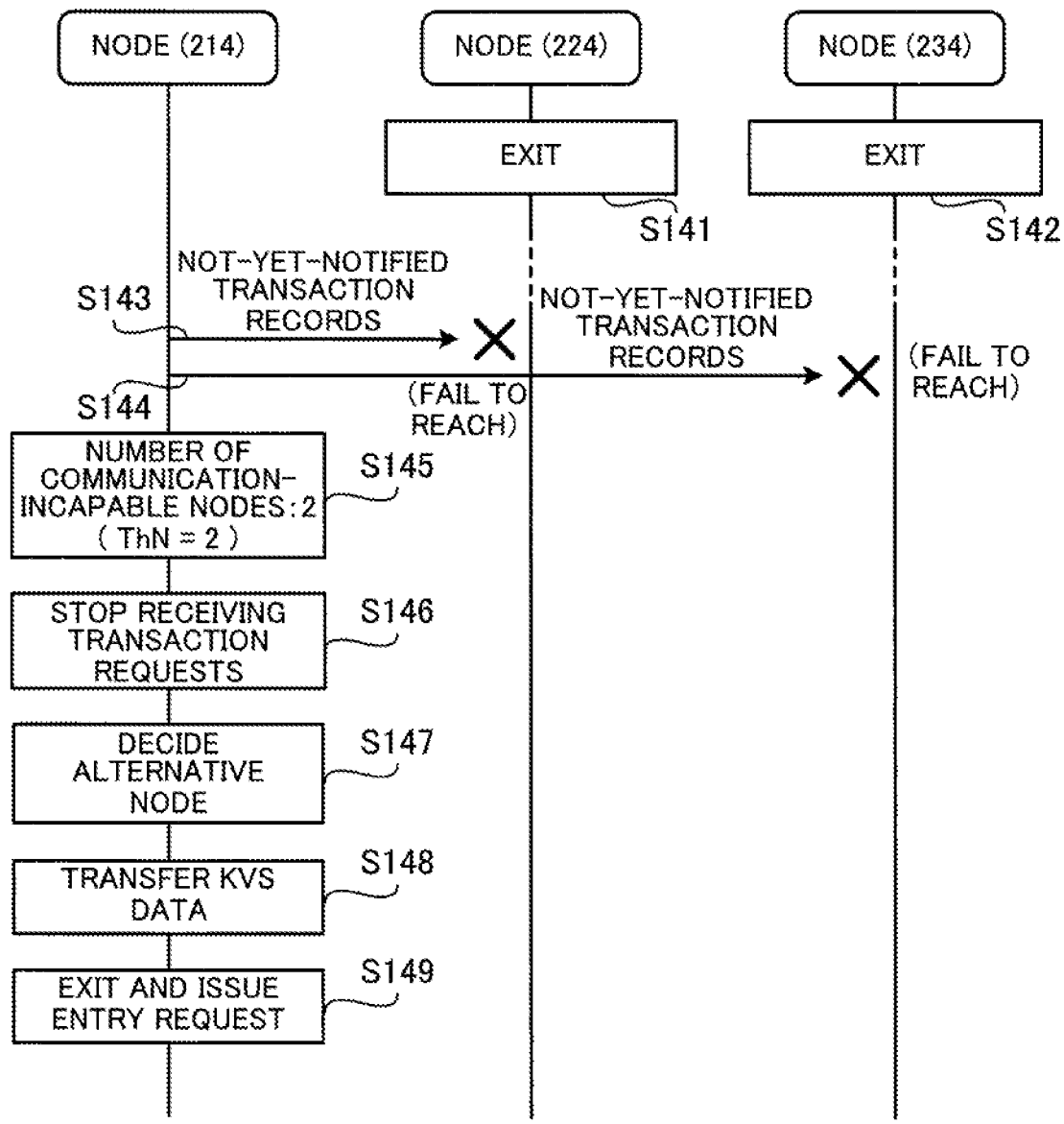
FIG. 22 is a second sequence diagram illustrating the synchronization and alive monitoring processing according to the second embodiment.

Next described is a sequence of synchronization and alive monitoring processing with reference to FIGS. 20 to 22. FIG. 20 illustrates the synchronization and alive monitoring processing according to the second embodiment. FIG. 21 is a first sequence diagram illustrating the synchronization and alive monitoring processing sequence according to the second embodiment. FIG. 22 is a second sequence diagram illustrating the synchronization and alive monitoring processing sequence according to the second embodiment.

The example of FIG. 20 depicts synchronization of transaction records and KVS data among the normal nodes 214, 224, and 234 assigned to the same identifier. Note that the synchronization processing may be performed at predetermined intervals or timing, or may be performed when a KVS transaction is completed at a node and then the transaction history of the node is updated.

According to the example of FIG. 20, records of the following transactions have already been synchronized: a transaction of storing val03 in association with Key #3 (put) by the normal node 234; and a transaction of storing val04 in association with Key #4 (put) by the normal node 224. Then, in this condition, if the normal node 214 executes a transaction of deleting val03 associated with Key #3 (del), the transaction is listed as a not-yet-synchronized transaction record, as illustrated in FIG. 20.

Because this not-yet-synchronized transaction record has not been sent to the normal nodes 224 and 234, the normal node 214 notifies the normal nodes 224 and 234 of the transaction record to thereby request for synchronization of the transaction record. Upon receiving the request, each of the normal nodes 224 and 234 adds the sent transaction record to its own transaction history (as a not-yet-synchronized transaction record). In addition, based on the added transaction record, the normal nodes 224 and 234 individually update their KVS data. In this example, val03 associated with Key #3 is deleted.

In addition, the normal node 214 calculates a checksum based on the not-yet-synchronized record and notifies each of the normal nodes 224 and 234 of the calculated checksum. The normal node 214 also acquires, from each of the normal nodes 224 and 234, a checksum calculated for not-yet-synchronized transaction records held therein. Then, when the checksums acquired from the normal nodes 224 and 234 match its own calculated checksum, the normal node 214 changes the status of the not-yet-synchronized records used for the checksum calculation to "synchronized", and adds version information to the record with the status changed to "synchronized".

In the example of FIG. 20, version information Ver. 002 is added to the record whose status has been changed from "not-yet-synchronized" to "synchronized". Note that each of the normal nodes 224 and 234 makes a checksum comparison in a similar fashion. Then, when all the compared checksums match each other, the status of the record is changed from "not-yet-synchronized" to "synchronized", and version information Ver. 002 is added to the record with the status changed to "synchronized".

As described above, in synchronization, all the nodes assigned to the same identifier have communication with one another. Therefore, it is possible to detect a node in a state incapable of establishing communication in performing synchronization. For example, the normal node 214 transmits, to each of the normal nodes 224 and 234, a message to check its operational state, and checks whether an acknowledgement of the message is received (alive monitoring). Then, the normal node 214 performs synchronization with nodes having sent the acknowledgements back.

Procedures performed by the normal nodes 214, 224, and 234 assigned to the same identifier when the normal node 214 has not-yet-notified transaction records take place, for example, in the following sequence (see FIG. 21).

[Steps S121 and S122] The normal node 214 transmits the not-yet-notified transaction records to the normal nodes 224 and 234. In this regard, the normal node 214 refers to the same identifier node list and transmits the not-yet-notified transaction records to IP addresses of the normal nodes 224 and 234 assigned to the same identifier as that to which the normal node 214 is assigned.

[Steps S123 and S124] Upon receiving the not-yet-notified transaction records from the normal node 214, the normal nodes 224 and 234 individually return an acknowledgement indicating the completion of the reception to the normal node 214.

[Step S125] The normal node 214 receives the acknowledgements from the normal nodes 224 and 234, and then counts the number of nodes in a state incapable of communication ("the number of communication-incapable nodes") according to whether an acknowledgment from each of the normal nodes 224 and 234 has been received. In this example, because the normal nodes 224 and 234 are in a state capable of communication, the number of communication-incapable nodes is 0. Then, the normal node 214 determines whether the number of communication-incapable nodes is equal to or more than a threshold ThN. The threshold ThN may be set to a number greater than or equal to 1 and, for example, set to a number obtained by subtracting 1 from the number of multiplicity of the identifier spaces (2 in this example).

In the case where the multiplicity of identifier spaces is 3, the number of communication-incapable nodes being 2 means that all the remaining nodes assigned to the same identifier as that to which the normal node 214 is assigned have exited the system (and are therefore not able to communicate normally). That is, redundancy of the KVS data has been lost. When the conditions are like this, a process described later is performed in order to restore the redundancy. In the condition of step S125 in FIG. 21, because the number of communication-incapable nodes is 0, the normal node 214 determines that the number of communication-incapable nodes is not equal to or more than the threshold ThN, and continues to engage in its operations.

[Steps S126 and S127] The normal node 224 updates its own transaction history based on the not-yet-notified transaction records received from the normal node 214 (see FIG. 20). In addition, the normal node 224 applies unexecuted KVS transactions in the updated transaction history (KVS transactions corresponding to the not-yet-notified transaction records) to its own KVS data. Then, the normal node 224 continues to engage in its operations.

[Steps S128 and S129] The normal node 234 updates its own transaction history based on the not-yet-notified transaction records received from the normal node 214 (see FIG. 20). In addition, the normal node 234 applies unexecuted KVS transactions in the updated transaction history (KVS transactions corresponding to the not-yet-notified transaction records) to its own KVS data. Then, the normal node 234 continues to engage in its operations.

After the completion of steps S125, S127, and S129, the normal nodes 214, 224, and 234, respectively, continue to engage in their operations. Now let us assume that the normal node 234 exits (step S130 to be described later) at a point in time afterward and, then, the need arises for synchronization in which the normal node 214 notifies the other normal nodes 224 and 234 of not-yet-notified transaction records. In this case, procedures take place in the following sequence.

[Step S130] The normal node 234 exits, for example, when the communication environment becomes worse or when the normal node 234 is turned off. The normal node 234 also exits when the user of the normal node 234 has performed an operation of exiting the multiple distributed KVS system.

[Steps S131 and S132] At the timing of performing synchronization, the normal node 214 transmits the not-yet-notified transaction records to the normal nodes 224 and 234. In this regard, the normal node 214 refers to the same identifier node list and transmits the not-yet-notified transaction records to IP addresses of the normal nodes 224 and 234 assigned to the same identifier as that to which the normal node 214 is assigned.

[Step S133] Upon receiving the not-yet-notified transaction records from the normal node 214, the normal node 224 returns an acknowledgement indicating the completion of the reception to the normal node 214. On the other hand, because the normal node 234 has already exited, the not-yet-notified transaction records transmitted from the normal node 214 to the normal node 234 do not reach the normal node 234. Therefore, the normal node 234 does not transmit an acknowledgement of the not-yet-notified transaction records.

[Step S134] The normal node 214 receives the acknowledgement from the normal node 224, and then counts the number of nodes in a state incapable of communication ("the number of communication-incapable nodes") according to whether an acknowledgment from each of the normal nodes 224 and 234 has been received. In this example, because an acknowledgement is obtained from the normal node 224 but not obtained from the normal node 234, the number of communication-incapable nodes is 1.

Then, the normal node 214 determines whether the number of communication-incapable nodes is equal to or more than the threshold ThN. In the condition of step S134, because the number of communication-incapable nodes is 1, the normal node 214 determines that the number of communication-incapable nodes is not equal to or more than the threshold ThN, and continues to engage in its operations. That is, other than the normal node 214, the normal node 224 assigned to the same identifier is normally operating and redundancy of the KVS data is therefore maintained. As a result, the normal node 214 continues to engage in its operations.

[Steps S135 and S136] The normal node 224 updates its own transaction history based on the not-yet-notified transaction records received from the normal node 214 (see FIG. 20). In addition, the normal node 224 applies unexecuted KVS transactions in the updated transaction history (KVS transactions corresponding to the not-yet-notified transaction records) to its own KVS data. Then, the normal node 224 continues to engage in its operations.

As described above, because, in the multiple distributed KVS system, there are a plurality of nodes assigned to the same identifier, operations are continued even if one or more nodes exit the system as long as redundancy of the KVS data is not lost. In addition, as a matter of course, the redundancy state of the multiple distributed KVS system may be improved when the redundancy has been reduced before the redundancy is completely lost. For example, the mechanism of the second embodiment may be modified in such a manner that, if the multiplicity of identifier spaces is W (W≥4), a process of restoring redundancy is performed when the number of nodes assigned to the same identifier is reduced to 2. That is, by selecting an appropriate value for the threshold ThN according to the multiplicity of identifier spaces, it is possible to suitably decrease the risk of losing the KVS data.

Next described is a processing sequence performed when the number of communication-incapable nodes has fallen below the threshold ThN (see FIG. 22).

[Steps S141 and S142] The normal nodes 224 and 234 exit.

[Steps S143 and S144] At the timing of performing synchronization, the normal node 214 transmits not-yet-notified transaction records to the normal nodes 224 and 234. In this regard, the normal node 214 refers to the same identifier node list and transmits the not-yet-notified transaction records to IP addresses of the normal nodes 224 and 234 assigned to the same identifier as that to which the normal node 214 is assigned. Note however that, because the normal nodes 224 and 234 have already exited, the not-yet-notified transaction records do not reach the normal nodes 224 and 234. Therefore, the normal node 214 obtains no acknowledgements of the not-yet-notified transaction records from the normal nodes 224 and 234.

[Step S145] The normal node 214 counts the number of nodes in a state incapable of communication ("the number of communication-incapable nodes") according to whether an acknowledgment from each of the normal nodes 224 and 234 has been received. In this example, because no acknowledgements are obtained from the normal nodes 224 and 234, the number of communication-incapable nodes is 2. Then, the normal node 214 determines whether the communication-incapable nodes is equal to or more than the threshold ThN. In the condition of step S145 in FIG. 22, because the number of communication-incapable nodes is 2, the normal node 214 determines that the number of communication-incapable nodes is equal to or more than the threshold ThN. That is, other than the normal node 214, no other nodes assigned to the same identifier are operating normally, and redundancy of the KVS data has therefore been lost. In this case, the normal node 214 performs step S146 and the subsequent steps to deal with the situation.

[Step S146] The normal node 214 stops receiving KVS transaction requests.

[Step S147] The normal node 214 decides a destination node to which the functions of the normal node 214 are going to be transferred (an alternative node). For example, the normal node 214 searches for a node becoming newly responsible for keys currently assigned to the normal node 214 when the normal node 214 exits, and determines the node as the alternative node. Assuming in the example of FIG. 6 that the node with ID #4 exits, Key #3 and Key #4 assigned to the node with ID #4 are transferred to the node with ID #0. In this case, the normal node 214 determines the node with ID #0 (i.e., the initial node 210) as its alternative node. Note that KVS transaction requests made to the normal node 214 after the normal node 214 has stopped receiving them are transferred to the alternative node.

[Steps S148 and S149] The normal node 214 transfers its KVS data to the alternative node. Then, the normal node 214 notifies each node of its exit from the system, and also issues an entry request to the initial node 210. By issuing the entry request to the initial node 210, the normal node 214 is housed in the node pool 410.

As described above, each node assigned to the same identifier monitors the number of communication-incapable nodes in the synchronization process, and checks whether their multiplicity is maintained. Then, if the multiplicity is not sufficient and redundancy of the KVS data is therefore determined to have been reduced, control is exercised to cause a remaining node or nodes assigned to the identifier to exit and return to the node pool. If a sufficient number of nodes are in the node pool, a plurality of nodes are assigned to the same identifier and redundancy of the KVS data is thus restored. The synchronization and alive monitoring processing sequence has been described thus far.

[Synchronization Confirmation and Version Update]

Figure 23:
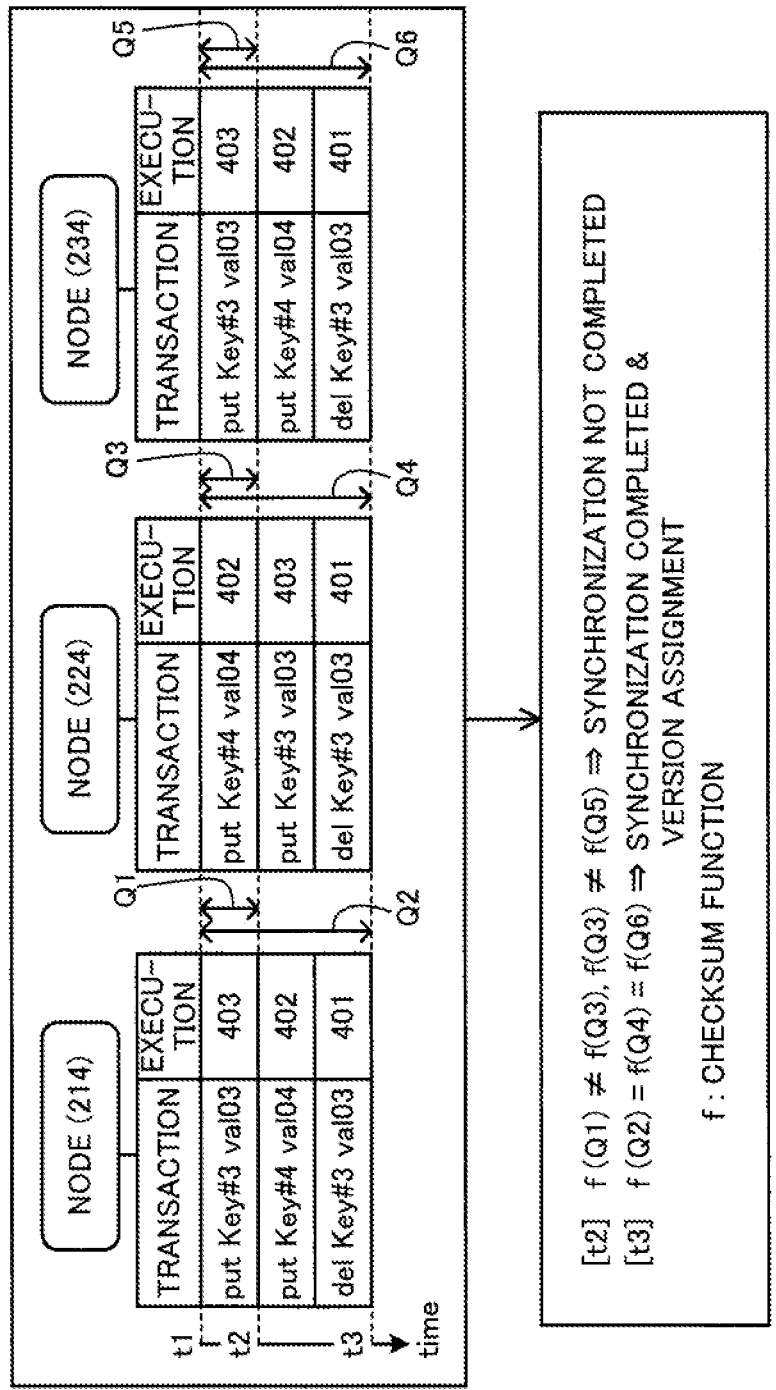
FIG. 23 illustrates synchronization confirmation and version update processing according to the second embodiment.
Figure 24:
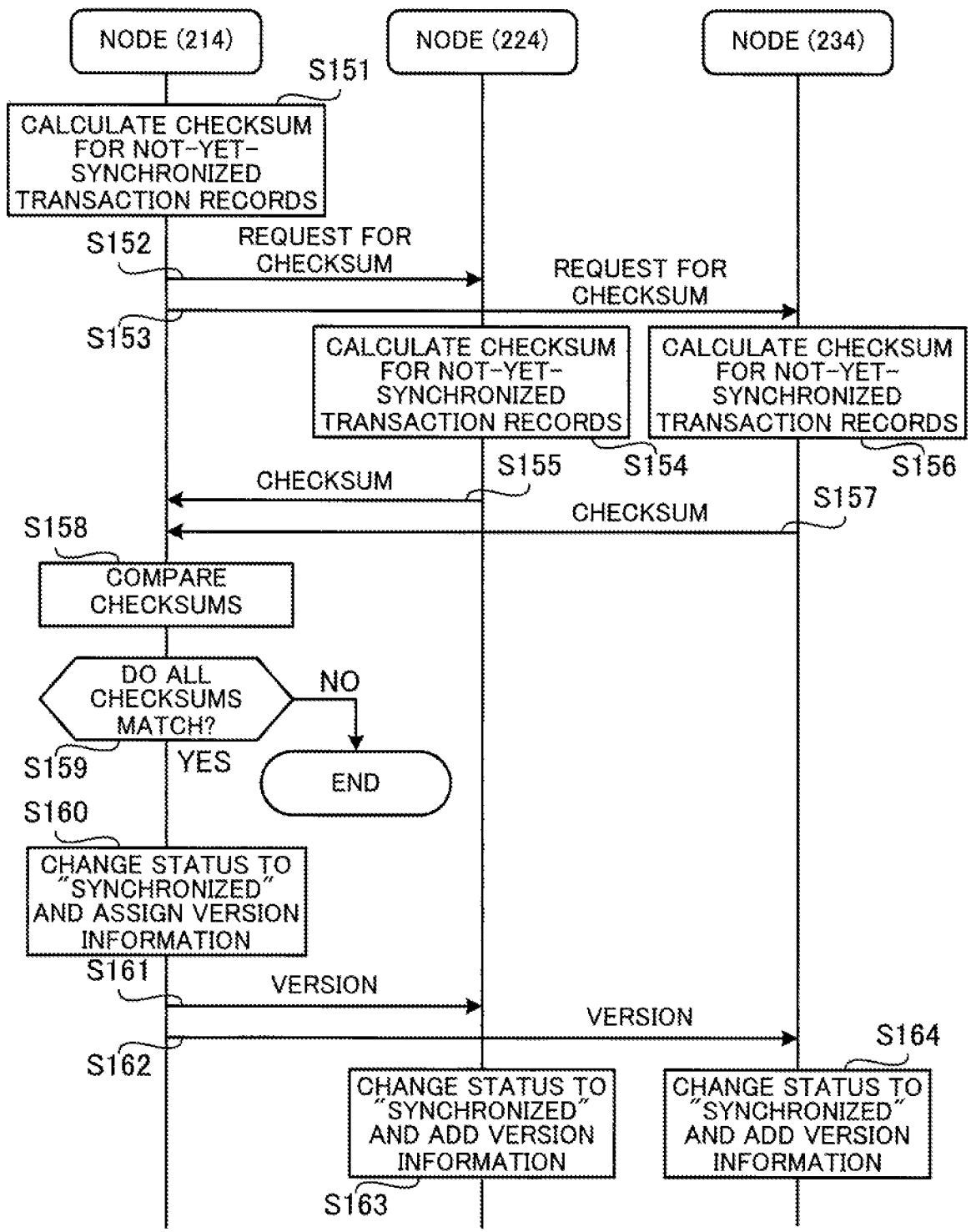
FIG. 24 is a sequence diagram illustrating the synchronization confirmation and version update processing according to the second embodiment.

Next described is a sequence of synchronization confirmation and version update processing with reference to FIGS. 23 and 24. FIG. 23 illustrates the synchronization confirmation and version update processing according to the second embodiment. FIG. 24 is a sequence diagram illustrating the synchronization confirmation and version update processing sequence according to the second embodiment. The example of FIG. 23 depicts implementation of synchronization confirmation of not-yet-synchronized records among the normal nodes 214, 224, and 234 and addition of version information (version update) to transaction records for which completion of synchronization has been confirmed. Note that, in each transaction history of the FIG. 23, the top entry is the oldest transaction record and the bottom entry is the latest transaction record (t1<t2<t3).

As described above, each of the normal nodes 214, 224, and 234 notifies one another of its executed transactions, and individually reflects the notified transactions into the transaction history and KVS data held therein. Therefore, if all the normal nodes 214, 224, and 234 are normally operating, their individual transaction histories include the same set of transaction records. However, there is a time lag between when a node executes a transaction and when other nodes receive a notification of the executed transaction. Therefore, the order of transaction records listed in the transaction history may vary among the normal nodes 214, 224, and 234, as illustrated in FIG. 23.

In view of this, the normal nodes 214, 224, and 234 determine that synchronization has been completed if a set of transaction records targeted for synchronization confirmation are made up of the same combination of transaction records. For this determination, a function is used which takes a set of transaction records in any order as an input and returning the same value for the same combination of transaction records included in the set (checksum function f). Assume that there are two transaction record sets S12 and S21 each including transaction records Op #1 and Op #2, and the set S12 is denoted as S12={Op #1, Op #2} and the set S21 is denoted as S21={Op #2, Op #1}. For the sets S12 and S21, the checksum function f returns the same value, i.e., f(S12)=f(S21).

As illustrate in FIG. 23, amongst transaction records held in the normal node 214, a set of transaction records between t1 and t2 is denoted by Q1, and a set of transaction records between t1 and t3 is denoted by Q2. Similarly, amongst transaction records held in the normal node 224, a set of transaction records between t1 and t2 is denoted by Q3, and a set of transaction records between t1 and t3 is denoted by Q4. Amongst transaction records held in the normal node 234, a set of transaction records between t1 and t2 is denoted by Q5, and a set of transaction records between t1 and t3 is denoted by Q6. In this case, if synchronization confirmation is implemented at t2, the following inequalities are obtained because the timing of each transaction record being reflected into the transaction history varies among the normal nodes 214, 224, and 234: f(Q1)≠f(Q3); and f(Q3)≠f(Q5). As a result, the normal nodes 214, 224, and 234 determine that synchronization is not completed. On the other hand, if synchronization confirmation is implemented at t3, the following equations are obtained: f(Q2)=f(Q4)=f(Q6). Therefore, the normal nodes 214, 224, and 234 determine that synchronization has been completed. Subsequently, version information is added to Q2, Q4, and Q6 in the example of FIG. 23.

Note that, amongst the nodes assigned to the same identifier, a node initiating synchronization confirmation may be set in advance, or may be selected randomly. For example, in the case where the normal node 214 initiates synchronization confirmation, the processing is performed in the following sequence (see FIG. 24).

[Step S151] The normal node 214 calculates a checksum for not-yet-synchronized transaction records included in its transaction history. Note that the checksum is calculated using a function taking a set of transactions in any order as an input and returning the same value for the same combination of transactions included in the set (see the checksum function f of FIG. 23).

[Steps S152 and S153] The normal node 214 requests each of the normal nodes 224 and 234 assigned to the same identifier to calculate a checksum for not-yet-synchronized transaction records included its transaction history and return the calculated checksum to the normal node 214.

[Steps S154 and S155] The normal node 224 calculates a checksum for not-yet-synchronized transaction records included in its transaction history. Note that the normal node 224 calculates the checksum using the same function as that the normal node 214 used for its checksum calculation. Then, the normal node 224 notifies the normal node 214 of the calculated checksum.

[Steps S156 and S157] The normal node 234 calculates a checksum for not-yet-synchronized transaction records included in its transaction history. Note that the normal node 234 calculates the checksum using the same function as that the normal node 214 used for its checksum calculation. Then, the normal node 234 notifies the normal node 214 of the calculated checksum.

[Steps S158 and S159] The normal node 214 compares the checksum calculated in step S151 with the checksums notified by the normal nodes 224 and 234. If all the compared checksums match, the normal node 214 moves to step S160. On the other hand, if there is a checksum mismatch, the normal node 214 ends the synchronization confirmation processing.

[Step S160] The normal node 214 changes the status of the not-yet-synchronized transaction records used for the checksum calculation in step S151 to "synchronized", and assigns version information to the records with the status changed to "synchronized". For example, the normal node 214 refers to version information assigned to previously synchronized transaction records (Ver. 001 in the example of FIG. 20) and adds version information indicating the latest version (Ver. 002) to the transaction records whose status is newly changed to "synchronized".

[Steps S161 and S162] The normal node 214 notifies the normal nodes 224 and 234 of the version information added to the transaction records whose status is newly changed to "synchronized". Note that the procedure may be modified in such a manner that the normal node 214 notifies the normal nodes 224 and 234 of the match of all the checksums, and each of the normal nodes 224 and 234 autonomously changes the status of the corresponding transaction records (from "not-yet-synchronized" to "synchronized") and adds the version information.

[Step S163] The normal node 224 changes the status of the not-yet-synchronized transaction records used for the checksum calculation in step S154 to "synchronized", and adds the version information notified by the normal node 214 to the transaction records with the status changed to "synchronized".

[Step S164] The normal node 234 changes the status of the not-yet-synchronized transaction records used for the checksum calculation in step S156 to "synchronized", and adds the version information notified by the normal node 214 to the transaction records with the status changed to "synchronized". After the completion of step S164, a sequence of the synchronization confirmation and version update processing illustrated in FIG. 24 ends. The synchronization confirmation and version update processing sequence has been described thus far.

[Node Re-Entry]

Figure 25:
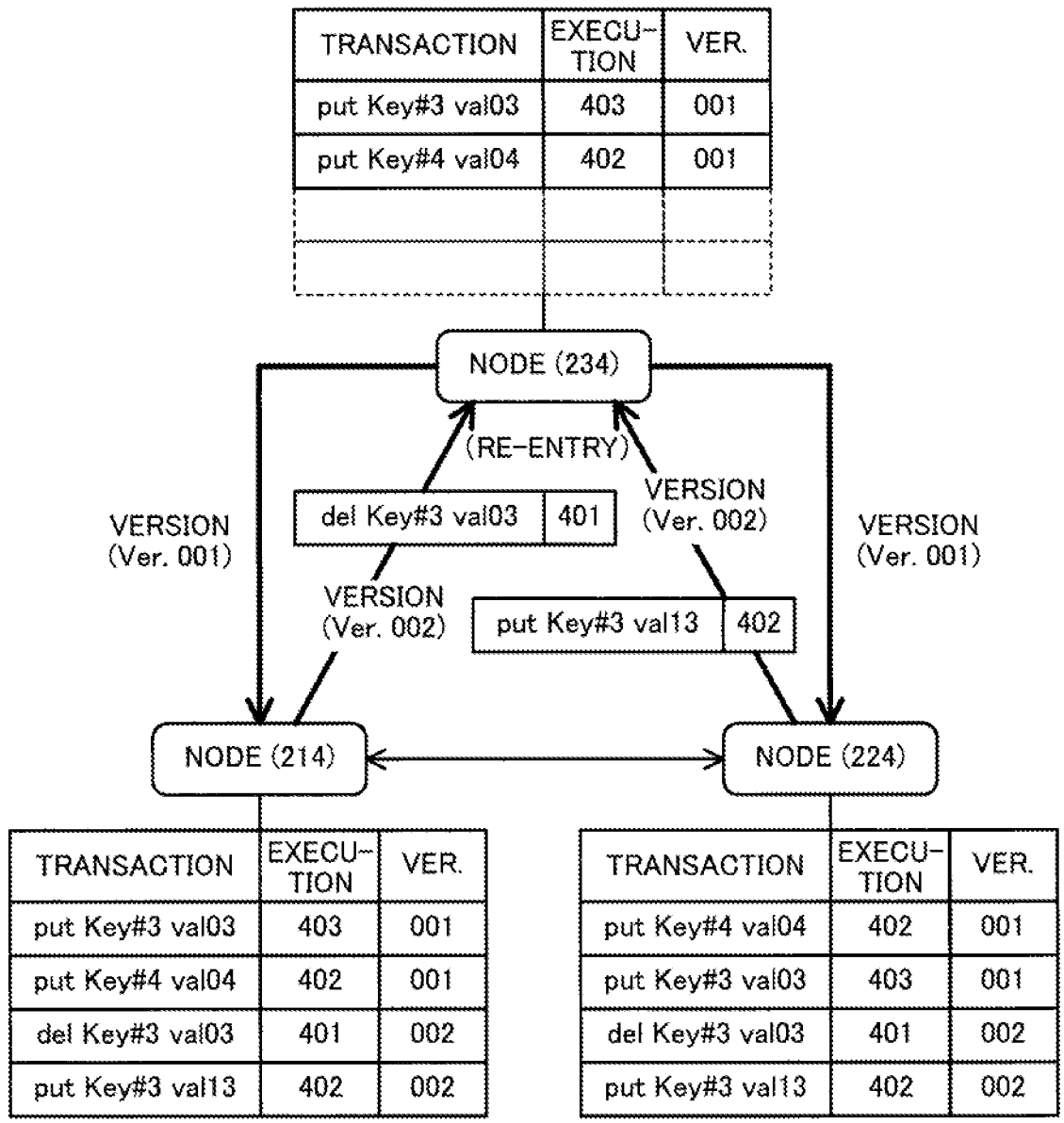
FIG. 25 illustrates re-entry and synchronization processing according to the second embodiment.
Figure 26:
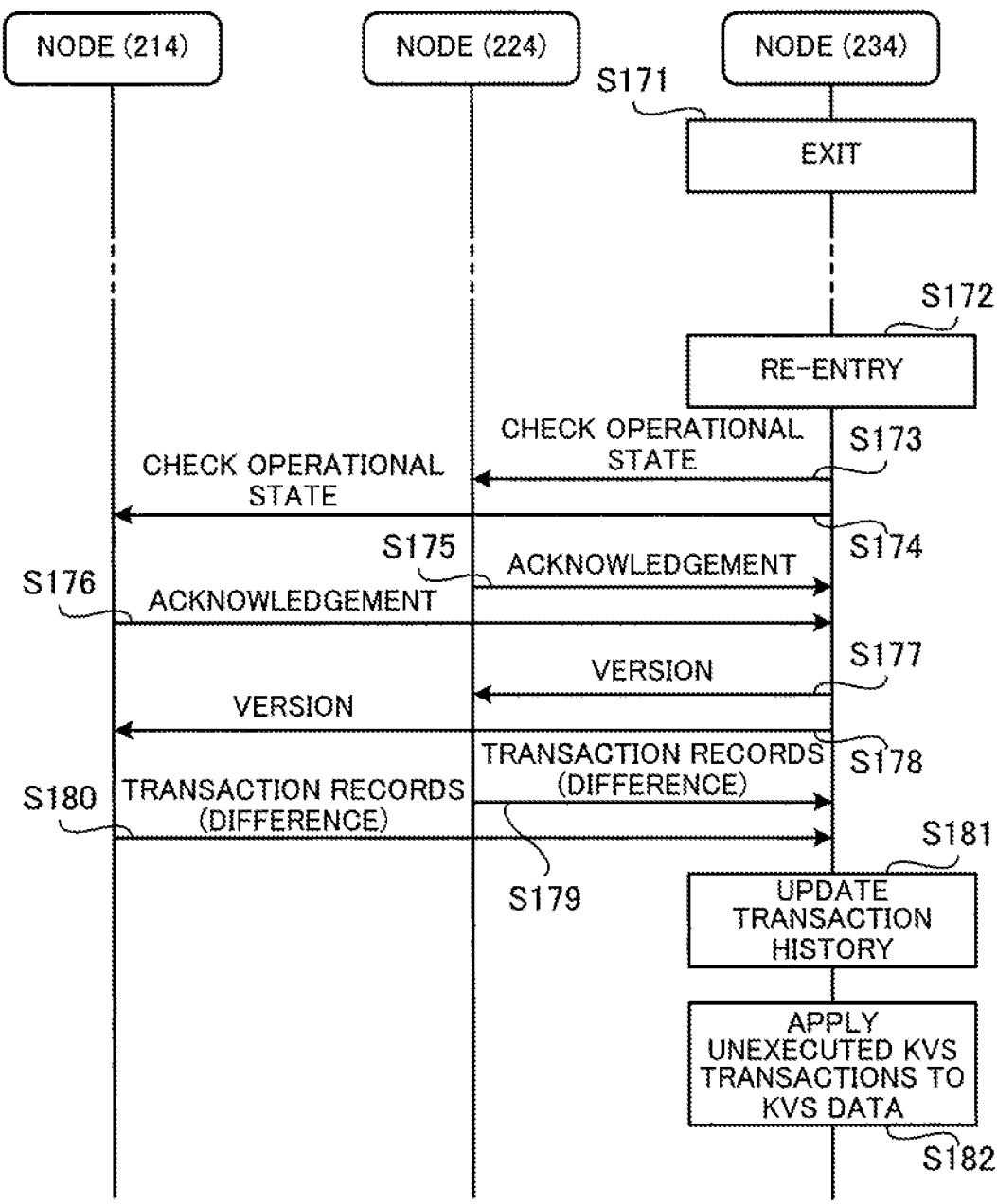
FIG. 26 is a sequence diagram illustrating the re-entry and synchronization processing according to the second embodiment.

Next described is a sequence of re-entry and synchronization processing with reference to FIGS. 25 and 26. FIG. 25 illustrates the re-entry and synchronization processing according to the second embodiment. FIG. 26 is a sequence diagram illustrating the e-entry and synchronization processing sequence according to the second embodiment. The example of FIG. 25 depicts synchronization performed when the normal node 234 re-enters after having once exited. In the case where the normal node 234 is a mobile terminal, the normal node 234 may be temporarily brought into a state incapable of communication due to changes in the communication environment. In this case, the normal node 234 is determined to have exited, as illustrated in FIG. 21 (see steps S132 and S134).

If the normal node 234 after having temporarily exited is assigned to a new identifier and allowed to re-enter, access to the KVS data and the transaction history held in the normal node 234 is no longer available. On the other hand, in the case where the normal node 234 returns to a normal communication state promptly after having temporarily gone into a state incapable of communication, it is possible to reduce burden on the system by allowing the normal node 234 to re-enter while assigning it to its original identifier and continue its operations using the KVS data and transaction history already held therein.

As explained with reference to FIG. 21, in the multiple distributed KVS system, even when, amongst nodes assigned to the same identifier, one or more nodes have exited, the remaining nodes continue to engage in their operations. In view of this, a node having temporarily exited is assigned back to its original identifier and allowed to re-enter when the remaining nodes are carrying on the operations, and synchronization of transaction records updated during the node staying off the system is then performed as illustrated in FIG. 25. Herewith, it is possible to carry on the operations with the re-entering node.

In the example of FIG. 25, the normal node 234 having re-entered acquires transaction records from the normal nodes 214 and 224 continuing the operations. In this regard, the normal node 234 notifies the normal nodes 214 and 224 of the latest version of transaction records held therein so as to acquire the difference between its own transaction history and the transaction history held in each of the normal nodes 214 and 224. For example, the normal node 214 checks the latest version notified by the normal node 234 against versions included in its own transaction history to thereby identify KVS transaction records corresponding to a newer version than the notified latest version. Then, the normal node 214 notifies the normal node 234, as the difference, of the content of KVS transactions that the normal node 214 has executed amongst the identified KVS transaction records. In this regard, the normal node 214 adds, to the KVS transactions to be notified, the version information thereof.

In like fashion, the normal node 224 checks the latest version notified by the normal node 234 against versions included in its own transaction history to thereby identify KVS transaction records corresponding to a newer version than the notified latest version. Then, the normal node 224 notifies the normal node 234, as the difference, of the content of KVS transactions that the normal node 224 has executed amongst the identified KVS transaction records. In this regard, the normal node 224 adds, to the KVS transactions to be notified, the version information thereof.

The normal node 234 adds, to its own transaction history, the content of KVS transactions and version information notified by each of the normal nodes 214 and 224 as the difference, and also reflects these KVS transactions in its own KVS data. Herewith, the KVS data is synchronized across the normal nodes 214, 224, and 234.

When the normal node 234 re-enters as described above, the normal node 234 and the normal nodes 214 and 224 assigned to the same identifier as that to which the normal node 234 is assigned perform processing in the following sequence (see FIG. 26).

[Steps S171 and S172] The normal node 234 exits. Then, the normal node 234 re-enters. Note that a mechanism may be adopted which allows the re-entry only if the period between the exit and the re-entry is shorter than a predetermined period of time (for example, 1 second).

[Steps S173 and S174] The normal node 234 transmits a message to check the operational state to each of the normal nodes 214 and 224. In this regard, by referring to the same identifier node list, the normal node 234 transmits the messages to IP addresses of the normal nodes 214 and 224 assigned to the same identifier.

[Steps S175 and S176] Upon receiving the operational-state check messages from the normal node 234, the normal nodes 214 and 224 individually return an acknowledgement indicating the completion of the reception. Note that, in this example, the normal nodes 214 and 224 are operating, and the acknowledgements of the operation-state check messages are therefore returned from the normal nodes 214 and 224 to the normal node 234. However, in the case where the normal nodes 214 and 224 have already exited as in the example of FIG. 22, no acknowledgements of the operation-state check messages are returned to the normal node 234. In this case, the normal node 234 ends the re-entry processing and then issues an entry request, for example, to the initial node 210.

[Steps S177 and S178] The normal node 234 notifies each of the normal nodes 214 and 224 of the latest version of transaction records held therein and requests for the difference in their transaction histories.

[Step S179] The normal node 224 checks the latest version notified by the normal node 234 against versions included in its own transaction history to thereby identify KVS transaction records corresponding to a newer version than the notified latest version. Then, the normal node 224 notifies the normal node 234, as the difference, of the content of KVS transactions that the normal node 224 has executed amongst the identified KVS transaction records. In this regard, the normal node 224 adds, to the KVS transactions to be notified, the version information thereof.

[Step S180] The normal node 214 checks the latest version notified by the normal node 234 against versions included in its own transaction history to thereby identify KVS transaction records corresponding to a newer version than the notified latest version. Then, the normal node 214 notifies the normal node 234, as the difference, of the content of KVS transactions that the normal node 214 has executed amongst the identified KVS transaction records. In this regard, the normal node 214 adds, to the KVS transactions to be notified, the version information thereof.

[Steps S181 and S182] The normal node 234 updates its own transaction history based on the differences in the transaction histories, received from the normal nodes 214 and 224. In addition, the normal node 234 applies unexecuted KVS transactions in the updated transaction history (KVS transactions corresponding to the differences in the transaction histories) to its own KVS data. After completing the processing up to step S182, the normal nodes 214, 224, and 234 then carry on their operations.

As described above, a node having temporarily exited is assigned to its original identifier, and the transaction history of the node is synchronized with those of other nodes assigned to the same identifier and then the KVS data is updated. Herewith, the multiple distributed KVS system is restored to the state before the node exit. Allowing such a re-entry saves the need for processes involved in the entry of a new node, such as restructuring of routing tables, key reassignment, and transfer of KVS data. As a result, even if nodes frequently repeat entering and exiting, it is possible to control a decrease in system performance.

Further, adding version information to synchronized transaction records facilitates comprehension of the synchronization state and allows synchronization of the transaction history and KVS data of a re-entering node using the difference between the transaction history and those of nodes assigned to the same identifier. As a result, the communication load and processing load involved in the re-entry are further reduced, and it is possible to control a decrease in system performance even if nodes frequently repeat entering and exiting. The re-entry and synchronization processing sequence has been described thus far.

[RTT Measurement]

Figure 27:
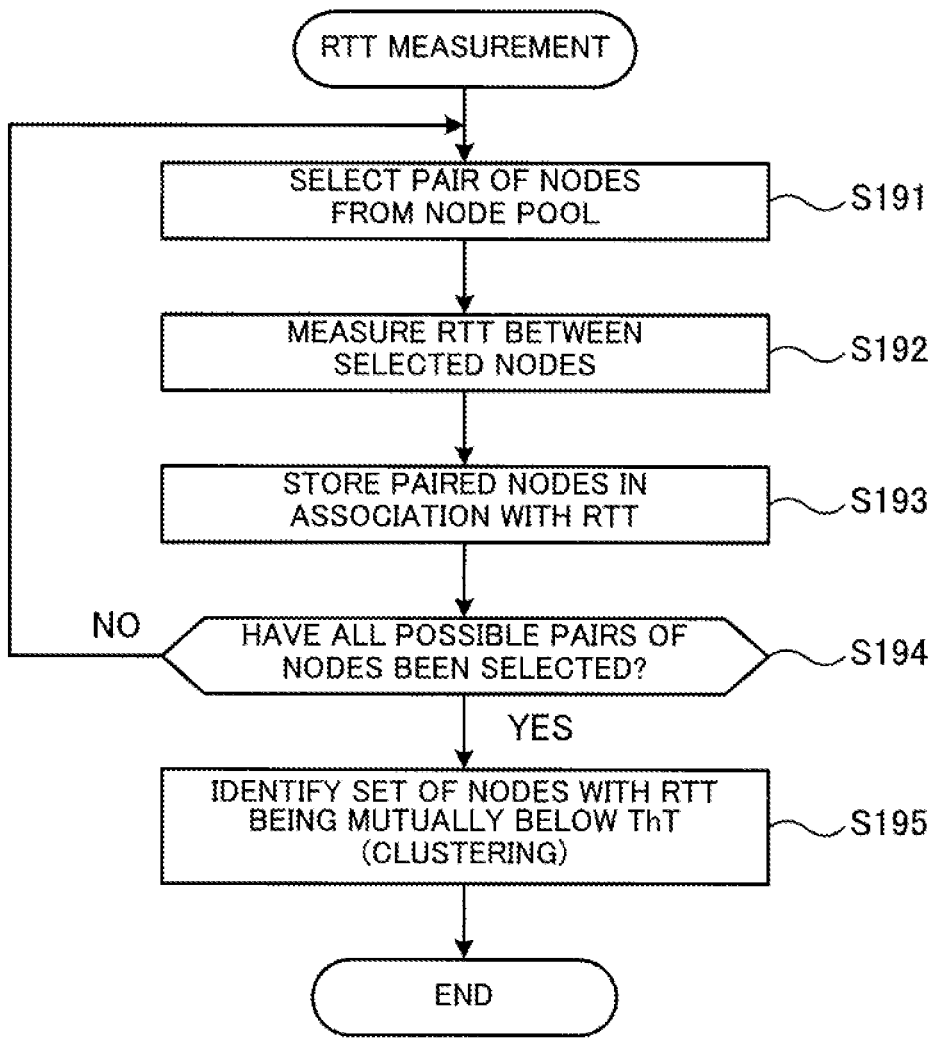
FIG. 27 is a flow diagram illustrating a processing sequence taking place at the time of RTT measurement according to the second embodiment.

Next described is a processing sequence taking place at the time of RTT measurement, with reference to FIG. 27. FIG. 27 is a flow diagram illustrating the processing sequence taking place at the time of RTT measurement according to the second embodiment. In the following example, let us assume that the initial node 210 performs the RTT measurement for the purpose of illustration.

[Step S191] By referring to the node pool information 241f, the pool managing unit 244 selects a pair of nodes from the node pool 410.

[Step S192] The pool managing unit 244 measures the RTT between the nodes selected in step S191. For example, the pool managing unit 244 notifies one of the selected paired nodes of the IP address of the other node, and instructs the node to measure the RTT using ping, which is a piece of software used to test the reachability of a node in an IP network. Then, the pool managing unit 244 acquires the RTT from the node to which the instruction has been sent.

[Step S193] The pool managing unit 244 stores, in the storing unit 241, the paired nodes selected in step S191 in association with the RTT acquired in step S192 as the RTT data 241g.

[Step S194] The pool managing unit 244 determines whether all possible pairs of nodes have been selected. If all the possible pairs of nodes have been selected, the pool managing unit 244 moves to step S195. On the other hand, if there is an unselected pair of nodes, the pool managing unit 244 moves to step S191.

[Step S195] With reference to the RTT data 241g, the pool managing unit 244 identifies a set of nodes with RTT being mutually below a threshold ThT (for example, 100 milliseconds). The set of such nodes is referred to as the "neighboring node group", and the process of identifying the neighboring node group is referred to as "clustering".

For example, the pool managing unit 244 selects, from the node pool 410, as many nodes as the number of identifier spaces (multiplicity), and determines whether, for each pair of nodes out of the selected nodes, the RTT between the nodes is below the threshold ThT. Then, if each of the RTT's of all the pairs is below the threshold ThT, the pool managing unit 244 identifies the set of selected nodes as a neighboring node group (see FIG. 15). After the completion of step S195, a sequence of processing of FIG. 27 ends. The processing sequences taking place in the multiple distributed KVS system have been described thus far.

As described above, the multiple distributed KVS system prevents data loss caused by a node exit by providing multiple logical spaces, each of which is occupied by identifiers, and redundantly assigning nodes to the same identifier to thereby implement redundancy of KVS data. In addition, even if one or more nodes amongst nodes assigned to the same identifier exit, the system operations are continued by the remaining nodes as long as the redundancy is maintained within an acceptable range.

Therefore, even if nodes frequently repeat exits, it is possible to reduce processing load imposed at the time of each exit and maintain stable system performance. In addition, when a node having temporarily exited re-enters, the node is assigned to its original identifier and the transaction history of the node is synchronized with those of other nodes assigned to the same identifier. This saves the need for recalculating routing tables even if nodes frequently repeat exits and re-entries, thus providing suitable maintenance of system performance. That is, the cost of updating routing tables and the cost of transferring data for synchronization are reduced, and applying the technique of the second embodiment to a system including a number of nodes frequently repeating entries and exits produces significant effects.

Further, adding version information to synchronized transaction records facilitates comprehension of the synchronization state and allows synchronization of transaction history and KVS data of a re-entering node using the difference between the transaction history and those of nodes assigned to the same identifier. As a result, the communication load and processing load involved in the re-entry are further reduced, and it is possible to control a decrease in system performance even if nodes frequently repeat entering and exiting. That is, applying the technique of the second embodiment to a system including a number of nodes frequently repeating entries and exits produces significant effects.

Note that, for the illustrative purposes, the above description uses Chord, which is a DHT protocol, to explain the rules of the logical space with identifiers mapped thereinto, a key search algorithm, and the like. However, the technique of the second embodiment is also applicable to other DHT's and a Skip Graph. That is, the structure of providing multiple logical spaces, the processing taking place when, amongst nodes assigned to the same identifier, one or more nodes have exited, and the processing taking place at the time of a node re-entry are applicable to other approaches in a similar fashion. Therefore, modifications adopting such approaches are also well within the technical scope of the second embodiment. The second embodiment has been described thus far.

According to one aspect, it is possible to reduce load involved in node re-entries.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing an information management program that causes a processor of a computer including a memory to perform a procedure comprising:

storing, in a management table residing in the memory and used to manage a system that stores key-data pairs, each including a key obtained by application of a predetermined function and data associated with the key, in such a way as to be distributed among a plurality of nodes, information on an identifier common to a plurality of systems, one or more keys commonly assigned to the identifier, and nodes assigned to the identifier;

reassigning, when a node having once exited re-enters while remaining nodes continuously run operations, the node to a same identifier as before the exit; and reflecting the reassignment of the node into the management table, and implementing synchronization of one or more key-data pairs corresponding to the keys assigned to the identifier between the reassigned node and the remaining nodes assigned to the identifier;

when a node assigned to the identifier receives an update request for updating one of the corresponding key-data pairs, accumulating history data including content of the received update request, and provides remaining nodes assigned to the identifier with the history data to share the history data with the remaining nodes, and synchronization of the history data updated during the node staying off the system is performed, selecting a pair of nodes which includes a first node and a second node from a node pool including the plurality of nodes, measuring round trip time between the first node and the second node included in the selected pair of nodes, comparing the round trip time with a predetermined threshold and clusters a set of nodes with the round trip time being below the threshold as a neighboring node group, assigning a same identifier to nodes belonging to the neighboring node group, calculating a first checksum for not-yet-synchronized transaction records, the not-yet-synchronized transaction records indicating records of storing transaction of the key-data pairs, requesting each of the nodes assigned the same identifier to calculate a second checksum for the not-yet-synchronized transaction records, comparing the first checksum with the second checksums notified by the nodes, and changing a status of the not-yet-synchronized transaction records used for the first checksum calculation to synchronized transaction records, and assigns version information to manage a synchronization state to the synchronized transaction records, when the first checksum and the second checksums match.

2. The non-transitory computer-readable storage medium according to claim 1, wherein:

the procedure further includes determining whether the history data accumulated by the node is identical to the history data accumulated by the remaining nodes, updating a version number of the history data when the history data accumulated by the node is identical to the history data accumulated by the remaining nodes, and determining whether to implement the synchronization based on the version number.

3. The non-transitory computer-readable storage medium according to claim 2, wherein:

the procedure further includes identifying difference between a set of the corresponding key-data pairs stored in the reassigned node and a set of the corresponding key-data pairs stored in the remaining nodes, and implementing the synchronization for the identified difference.

4. The non-transitory computer-readable storage medium according to claim 3, wherein:

the implementing includes identifying difference between the history data accumulated by the reassigned node and the history data accumulated by the remaining nodes and updating the corresponding key-data pairs stored in the reassigned node based on content of update requests corresponding to the identified difference.

5. An information management method, executed by a processor of a computer including the processor and a memory, comprising:

storing, in a management table residing in the memory and used to manage a system that stores key-data pairs, each including a key obtained by application of a predetermined function and data associated with the key, in such a way as to be distributed among a plurality of nodes, information on an identifier common to a plurality of systems, one or more keys commonly assigned to the identifier, and nodes assigned to the identifier;

reassigning, when a node having once exited re-enters while remaining nodes continuously run operations, the node to a same identifier as before the exit; and reflecting, the reassignment of the node into the management table, and implementing synchronization of one or more key-data pairs corresponding to the keys assigned to the identifier between the reassigned node and the remaining nodes assigned to the identifier;

when a node assigned to the identifier receives an update request for updating one of the corresponding key-data pairs, accumulating history data including content of the received update request, and provides remaining nodes assigned to the identifier with the history data to share the history data with the remaining nodes, and synchronization of the history data updated during the node staying off the system is performed, selecting a pair of nodes which includes a first node and a second node from a node pool including the plurality of nodes, measuring round trip time between the first node and the second node included in the selected pair of nodes, comparing the round trip time with a predetermined threshold and clusters a set of nodes with the round trip time being below the threshold as a neighboring node group, assigning a same identifier to nodes belonging to the neighboring node group, calculating a first checksum for not-yet-synchronized transaction records, the not-yet-synchronized transaction records indicating records of storing transaction of the key-data pairs, requesting each of the nodes assigned the same identifier to calculate a second checksum for the not-yet-synchronized transaction records, comparing the first checksum with the second checksums notified by the nodes, and changing a status of the not-yet-synchronized transaction records used for the first checksum calculation to synchronized transaction records, and assigns version information to manage a synchronization state to the synchronized transaction records, when the first checksum and the second checksums match.

6. An information management apparatus comprising:

a memory configured to store a management table used to manage a system that stores key-data pairs, each including a key obtained by application of a predetermined function and data associated with the key, in such a way as to be distributed among a plurality of nodes, the management table storing therein information on an identifier common to a plurality of systems, one or more keys commonly assigned to the identifier, and nodes assigned to the identifier; and a processor configured to:

reassign, when a node having once exited re-enters while remaining nodes continuously run operations, the node to a same identifier as before the exit and reflect the reassignment of the node into the management table, and implement synchronization of one or more key-data pairs corresponding to the keys assigned to the identifier between the reassigned node and the remaining nodes assigned to the identifier;

when a node assigned to the identifier receives an update request for updating one of the corresponding key-data pairs, accumulate history data including content of the received update request, and provides remaining nodes assigned to the identifier with the history data to share the history data with the remaining nodes, and synchronization of the history data updated during the node staying off the system is performed, select a pair of nodes which includes a first node and a second node from a node pool including the plurality of nodes, measure round trip time between the first node and the second node included in the selected pair of nodes, compare the round trip time with a predetermined threshold and clusters a set of nodes with the round trip time being below the threshold as a neighboring node group, assign a same identifier to nodes belonging to the neighboring node group, calculate a first checksum for not-yet-synchronized transaction records, the not-yet-synchronized transaction records indicating records of storing transaction of the key-data pairs, request each of the nodes assigned the same identifier to calculate a second checksum for the not-yet-synchronized transaction records, compare the first checksum with the second checksums notified by the nodes, and change a status of the not-yet-synchronized transaction records used for the first checksum calculation to synchronized transaction records, and assigns version information to manage a synchronization state to the synchronized transaction records, when the first checksum and the second checksums match.

\* \* \* \* \*